United States Patent
Sasaki et al.

(10) Patent No.: US 9,324,341 B2
(45) Date of Patent: Apr. 26, 2016

(54) MAGNETIC HEAD FOR PERPENDICULAR MAGNETIC RECORDING INCLUDING A HEATER

(71) Applicants: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Tatsuya Shimizu, Hong Kong (CN)

(72) Inventors: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Tatsuya Shimizu, Hong Kong (CN)

(73) Assignees: HEADWAY TECHNOLOGIES, INC., Milpitas, CA (US); SAE MAGNETICS (H.K.) LTD., Hong Kong (CN)

( * ) Notice: Subject to any disclaimer, the term of this patent is extended or adjusted under 35 U.S.C. 154(b) by 65 days.

(21) Appl. No.: 14/083,088

(22) Filed: Nov. 18, 2013

(65) Prior Publication Data

US 2015/0138671 A1    May 21, 2015

(51) Int. Cl.
*G11B 5/127* (2006.01)
*G11B 5/60* (2006.01)
*G11B 5/31* (2006.01)
*G11B 5/00* (2006.01)

(52) U.S. Cl.
CPC .............. *G11B 5/127* (2013.01); *G11B 5/1278* (2013.01); *G11B 5/3133* (2013.01); *G11B 5/607* (2013.01); *G11B 5/31* (2013.01); *G11B 2005/0021* (2013.01)

(58) Field of Classification Search
USPC ................................................... 360/125.32
See application file for complete search history.

(56) References Cited

U.S. PATENT DOCUMENTS

| | | | |
|---|---|---|---|
| 8,094,418 B2 * | 1/2012 | Schreck et al. | 360/317 |
| 2008/0145709 A1 * | 6/2008 | Yamashita et al. | 428/811 |
| 2008/0291580 A1 * | 11/2008 | Yamashita | 360/314 |
| 2009/0251828 A1 | 10/2009 | Schreck et al. | |
| 2012/0218662 A1 | 8/2012 | Sasaki et al. | |

FOREIGN PATENT DOCUMENTS

JP    A-2008-077751    4/2008

* cited by examiner

*Primary Examiner* — Carlos E Garcia
(74) *Attorney, Agent, or Firm* — Oliff PLC

(57) ABSTRACT

A magnetic head includes a main pole, an expansion member, and a heater. The main pole has an end face located in a medium facing surface. The expansion member is located farther from the medium facing surface than is the main pole and adjacent to the main pole in a direction perpendicular to the medium facing surface. The heater heats the expansion member. The expansion member has a linear expansion coefficient higher than that of the main pole.

15 Claims, 16 Drawing Sheets

US 9,324,341 B2

MAGNETIC HEAD FOR PERPENDICULAR MAGNETIC RECORDING INCLUDING A HEATER

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that includes a heater for allowing the end face of the main pole located in the medium facing surface to protrude.

2. Description of the Related Art

The recording systems of magnetic read/write apparatuses include a longitudinal magnetic recording system in which signals are magnetized in a direction along the plane of a recording medium (the longitudinal direction) and a perpendicular magnetic recording system in which signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a main pole. The main pole has an end face located in a medium facing surface facing a recording medium. The coil produces a magnetic field corresponding to data to be written on the recording medium. The main pole allows a magnetic flux corresponding to the magnetic field produced by the coil to pass, and produces a write magnetic field from its end face.

A magnetic head for use in a magnetic disk drive such as a hard disk drive is typically in the form of a slider. The slider has the medium facing surface. The medium facing surface has an air inflow end (a leading end) and an air outflow end (a trailing end). The slider is designed to slightly fly over the surface of a recording medium by means of an airflow that comes from the leading end into the space between the medium facing surface and the recording medium.

It is demanded of magnetic disk drives that the distance from the end face of the main pole located in the medium facing surface to the surface of the recording medium be reduced in order to provide higher recording densities while preventing the writing capability of the write head unit from being reduced with increases in recording density. To meet this, there has been proposed a technique for heating the main pole with a heater to allow the end face of the main pole to protrude to thereby reduce the distance from the end face of the main pole to the surface of the recording medium, as described in U.S. Patent Application Publication Nos. 2009/0251828 A1 and 2012/0218662 A1, for example. U.S. Patent Application Publication Nos. 2009/0251828 A1 and 2012/0218662 A1 each disclose a magnetic head with a heater provided within an insulating layer near the main pole.

JP 2008-77751A discloses a magnetic head including a heater and a thermal conductive layer disposed near the heater.

In a conventional magnetic head including a heater for heating the main pole, components of the write head unit other than the main pole are also heated by the heater. A typical component of the write head unit other than the main pole is a write shield described in U.S. Patent Application Publication No. 2012/0218662 A1. The write shield has an end face located near the end face of the main pole in the medium facing surface.

For the conventional magnetic head including the heater, since the components of the write head unit other than the main pole are also heated by the heater as mentioned above, it is difficult to allow the end face of the main pole to greatly protrude relative to its neighboring surroundings located in the medium facing surface. The conventional magnetic head thus has a disadvantage that the distance from the end face of the main pole to the surface of the recording medium cannot be sufficiently reduced and therefore it is not possible to achieve sufficiently high recording density. Further, for the conventional magnetic head, the end face of the main pole does not always protrude by the greatest amount when compared with the other parts of the end face of the write head unit located in the medium facing surface. If any part of the end face of the write head unit other than the end face of the main pole protrudes by the greatest amount, it becomes difficult to recognize and control the distance from the end face of the main pole to the surface of the recording medium.

OBJECT AND SUMMARY OF THE INVENTION

It is an object of the present invention to provide a magnetic head for perpendicular magnetic recording that includes a heater to allow the end face of the main pole located in the medium facing surface to protrude, the magnetic head being capable of increasing the amount of protrusion of the end face of the main pole while suppressing protrusion of portions located around the end face of the main pole in the medium facing surface.

A magnetic head for perpendicular magnetic recording of the present invention includes a medium facing surface facing a recording medium, a coil producing a magnetic field corresponding to data to be written on the recording medium, a main pole, an expansion member, and a heater. The main pole has an end face located in the medium facing surface. The main pole allows a magnetic flux corresponding to the magnetic field produced by the coil to pass, and produces a write magnetic field for writing data on the recording medium by means of a perpendicular magnetic recording system. The expansion member is located farther from the medium facing surface than is the main pole, and is adjacent to the main pole in a direction perpendicular to the medium facing surface. The heater heats the expansion member. The expansion member has a linear expansion coefficient higher than that of the main pole.

In the magnetic head of the present invention, the expansion member may be formed of a nonmagnetic metal material. In this case, the main pole may be formed of a magnetic metal material containing any of Ni, Fe and Co, and the nonmagnetic metal material used to form the expansion member may have a linear expansion coefficient higher than that of each of Ni, Fe and Co.

The magnetic head of the present invention may further include a metal portion formed of a metal material and adjacent to the expansion member. The expansion member and the metal portion define therebetween a receiving space for receiving at least part of the heater. The at least part of the heater is received in the receiving space.

The magnetic head of the present invention may further include a first shield, a second shield, a gap part, a first return path section and a second return path section. The first shield is formed of a magnetic material and has an end face that is located in the medium facing surface at a position on the front side in the direction of travel of the recording medium relative to the end face of the main pole. The second shield is formed of a magnetic material and has an end face that is located in the medium facing surface at a position on the rear side in the direction of travel of the recording medium relative to the end face of the main pole. The gap part is formed of a nonmagnetic material and includes a first portion located between the main pole and the first shield and a second portion located between the main pole and the second shield. The first return path section is formed of a magnetic material and located on the front side in the direction of travel of the recording medium relative to the main pole. The second return path section is formed of a magnetic material and located on the rear side in the direction of travel of the recording medium relative to the main pole.

The first return path section includes a first yoke layer located away from the medium facing surface and in contact with the main pole, and a first connecting portion located on the front side in the direction of travel of the recording medium relative to the first shield and the first yoke layer. The first connecting portion connects the first shield and the first yoke layer to each other so that a first space is defined by the main pole, the first portion of the gap part, the first shield and the first return path section.

The second return path section includes a second yoke layer located away from the medium facing surface and in contact with the main pole, and a second connecting portion located on the rear side in the direction of travel of the recording medium relative to the second shield and the second yoke layer. The second connecting portion connects the second shield and the second yoke layer to each other so that a second space is defined by the main pole, the second portion of the gap part, the second shield and the second return path section.

The coil may include at least one first coil element passing through the first space and at least one second coil element passing through the second space.

Where the magnetic head of the present invention includes the first shield, the second shield, the gap part, the first return path section and the second return path section, the magnetic head may further include a metal portion formed of a metal material and adjacent to the expansion member. In this case, the expansion member and the metal portion define therebetween a receiving space for receiving at least part of the heater. The at least part of the heater is received in the receiving space.

The heater and the metal portion may be located on the front side in the direction of travel of the recording medium relative to the expansion member. In this case, the metal portion and the first yoke layer may be formed of one and the same magnetic metal material.

The heater and the metal portion may be located on the rear side in the direction of travel of the recording medium relative to the expansion member. In this case, the metal portion and the second yoke layer may be formed of one and the same magnetic metal material.

The heater may include a first heater portion located on the front side in the direction of travel of the recording medium relative to the expansion member, and a second heater portion located on the rear side in the direction of travel of the recording medium relative to the expansion member. The metal portion may include a first metal layer located on the front side in the direction of travel of the recording medium relative to the expansion member, and a second metal layer located on the rear side in the direction of travel of the recording medium relative to the expansion member. The first metal layer and the first yoke layer may be formed of one and the same first magnetic metal material. The second metal layer and the second yoke layer may be formed of one and the same second magnetic metal material.

In the magnetic head of the present invention, the expansion member is heated by the heater and expands, thereby applying to the main pole a force in the direction from the expansion member toward the medium facing surface. The end face of the main pole thereby protrudes. By virtue of such functions of the expansion member and the heater, the present invention makes it possible to increase the amount of protrusion of the end face of the main pole while suppressing protrusion of portions located around the end face of the main pole in the medium facing surface.

Other and further objects, features and advantages of the present invention will appear more fully from the following description.

DETAILED DESCRIPTION OF THE PREFERRED EMBODIMENTS

First Embodiment

Figure 1:
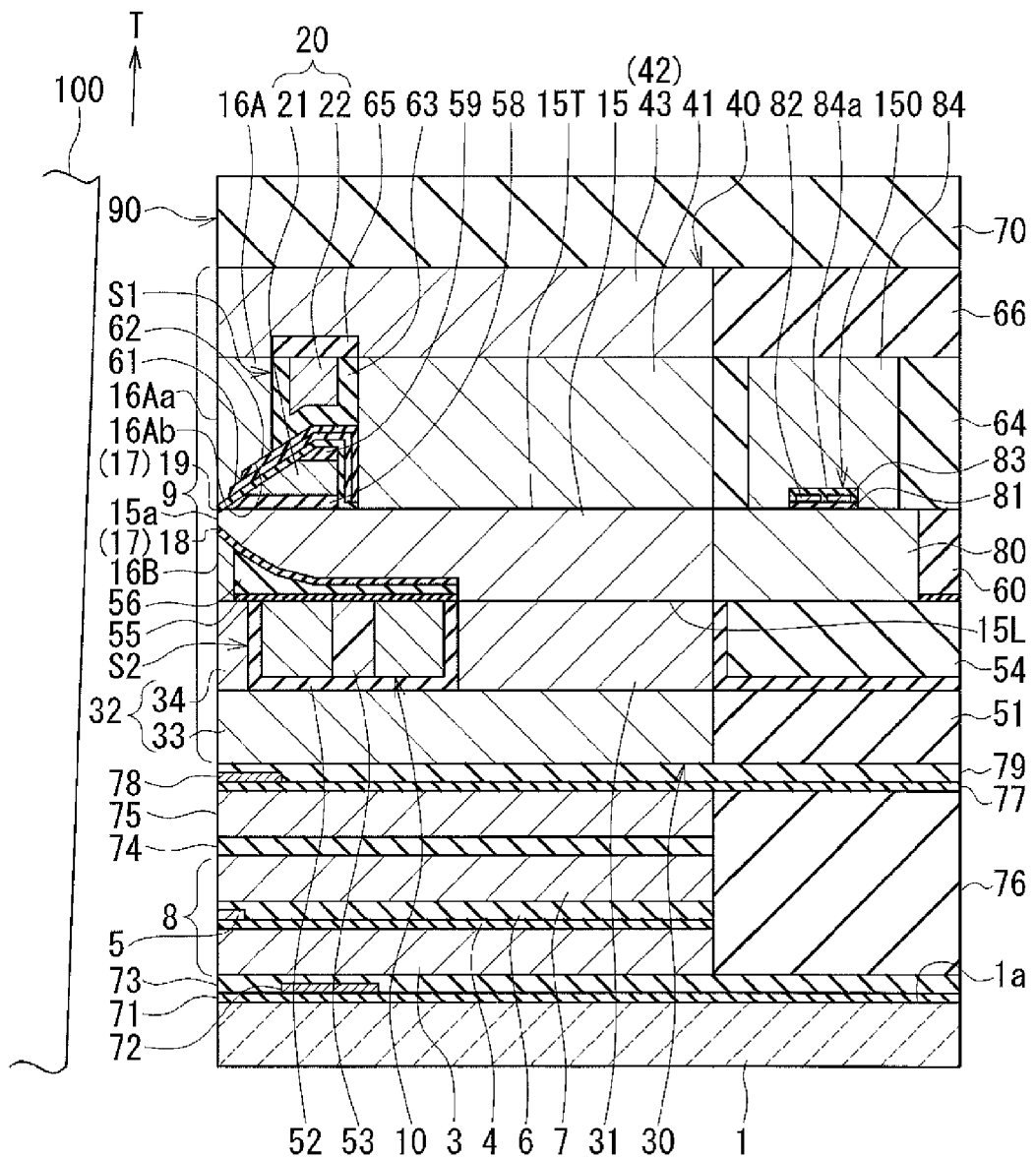
FIG. 1 is a cross-sectional view showing a magnetic head according to a first embodiment of the invention.
Figure 2:
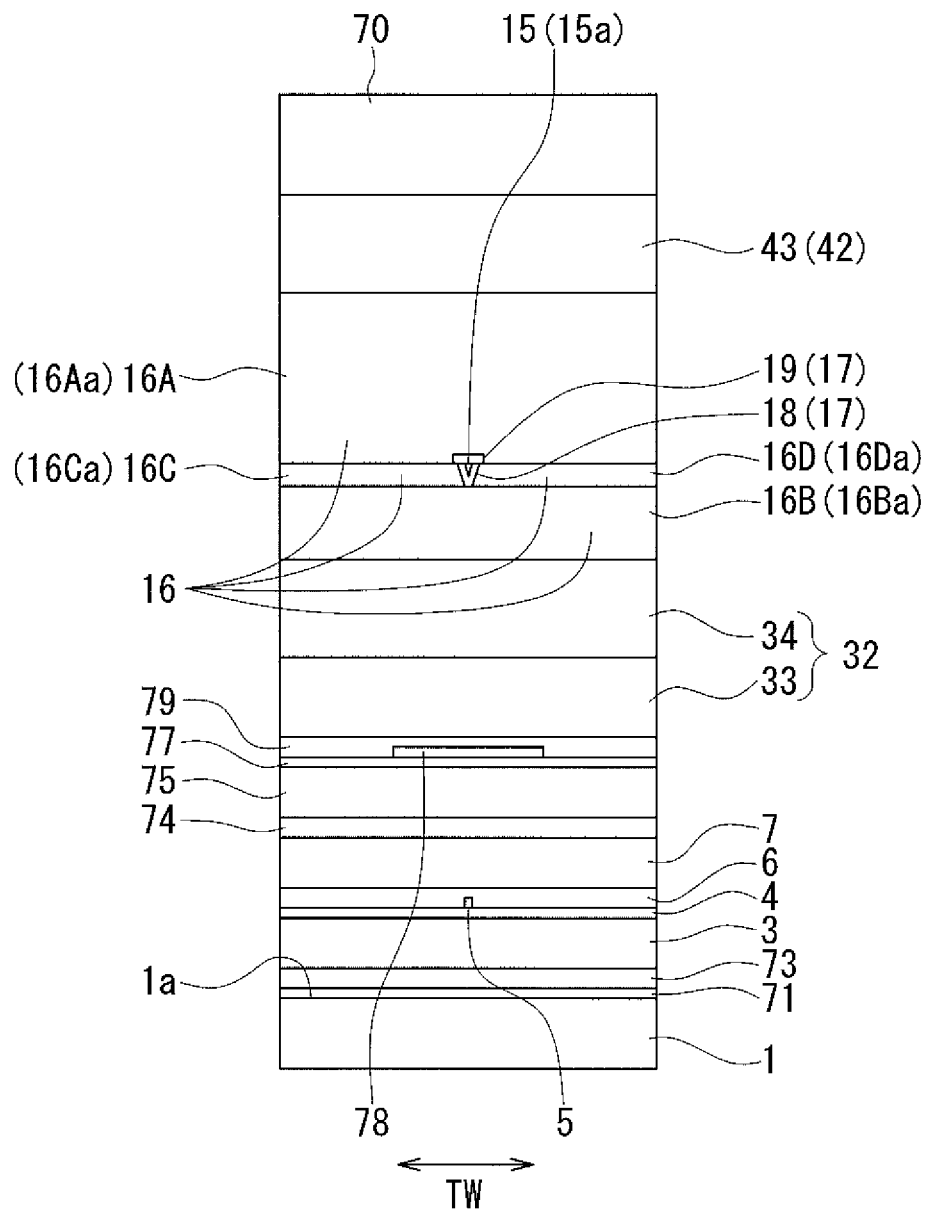
FIG. 2 is a front view showing the medium facing surface of the magnetic head according to the first embodiment of the invention.
Figure 3:
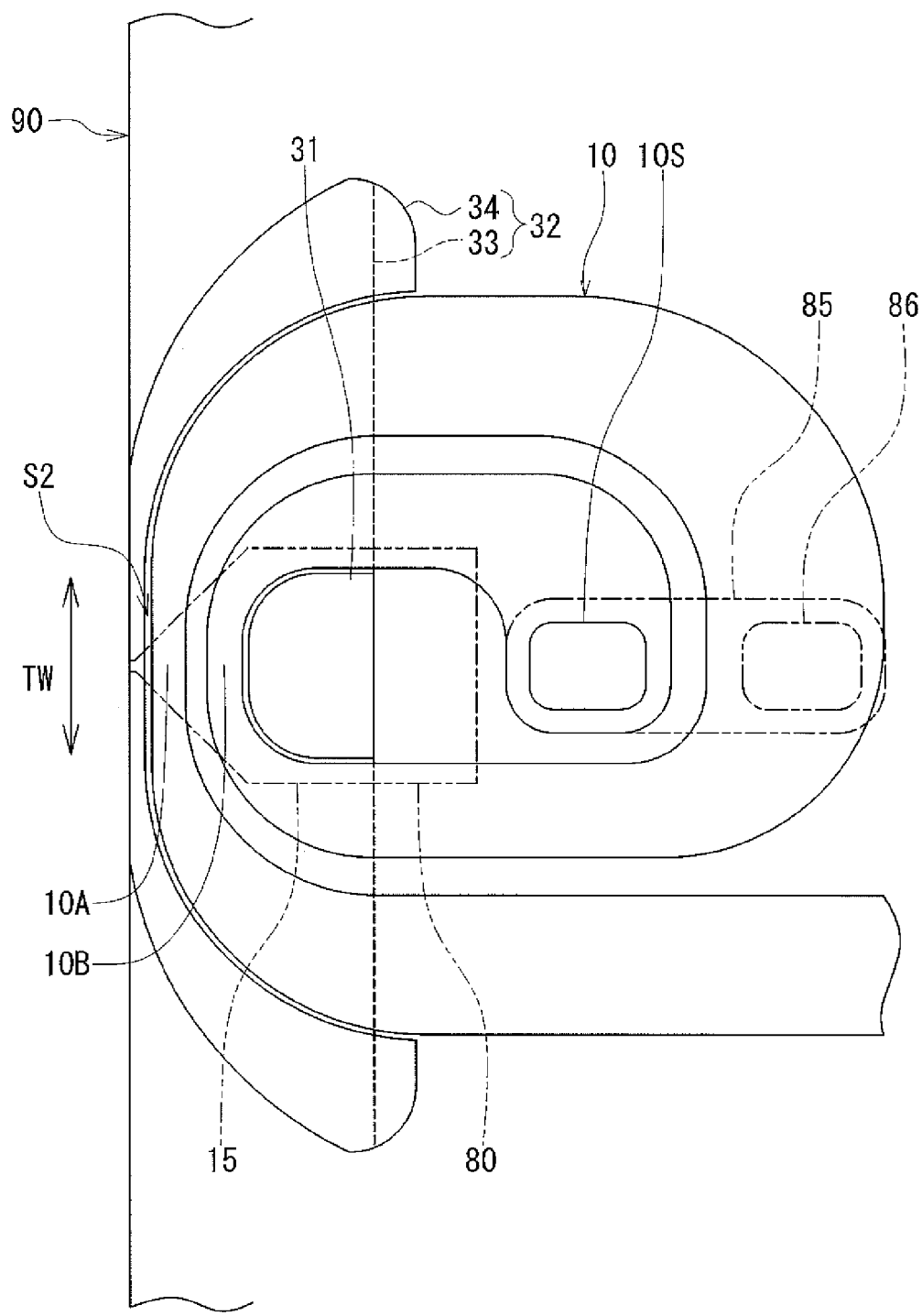
FIG. 3 is a plan view showing a second portion of a coil of the magnetic head according to the first embodiment of the invention.
Figure 4:
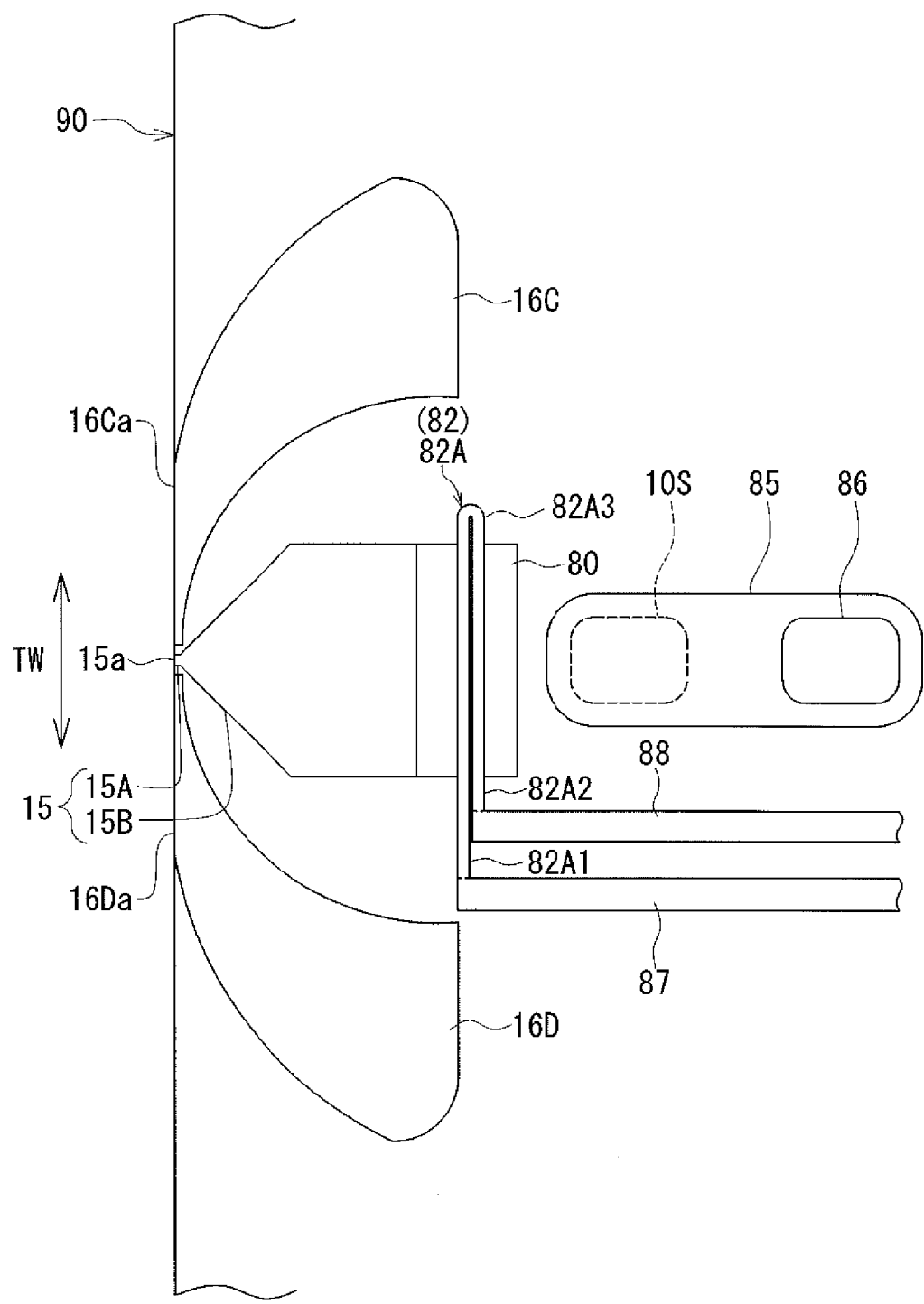
FIG. 4 is a plan view showing a main pole, an expansion member and a heater of the magnetic head according to the first embodiment of the invention.
Figure 5:
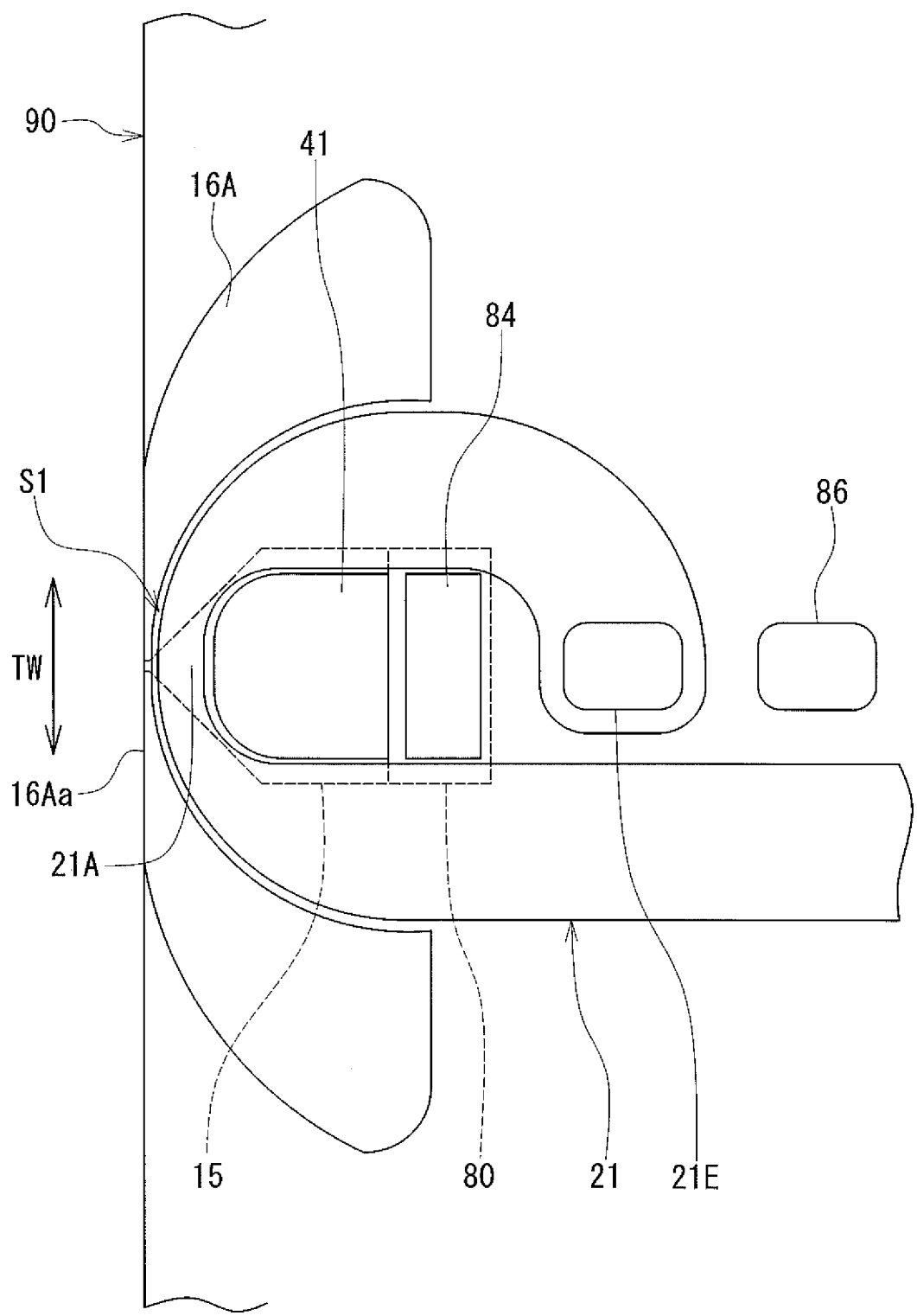
FIG. 5 is a plan view showing a first layer of a first portion of the coil of the magnetic head according to the first embodiment of the invention.
Figure 6:
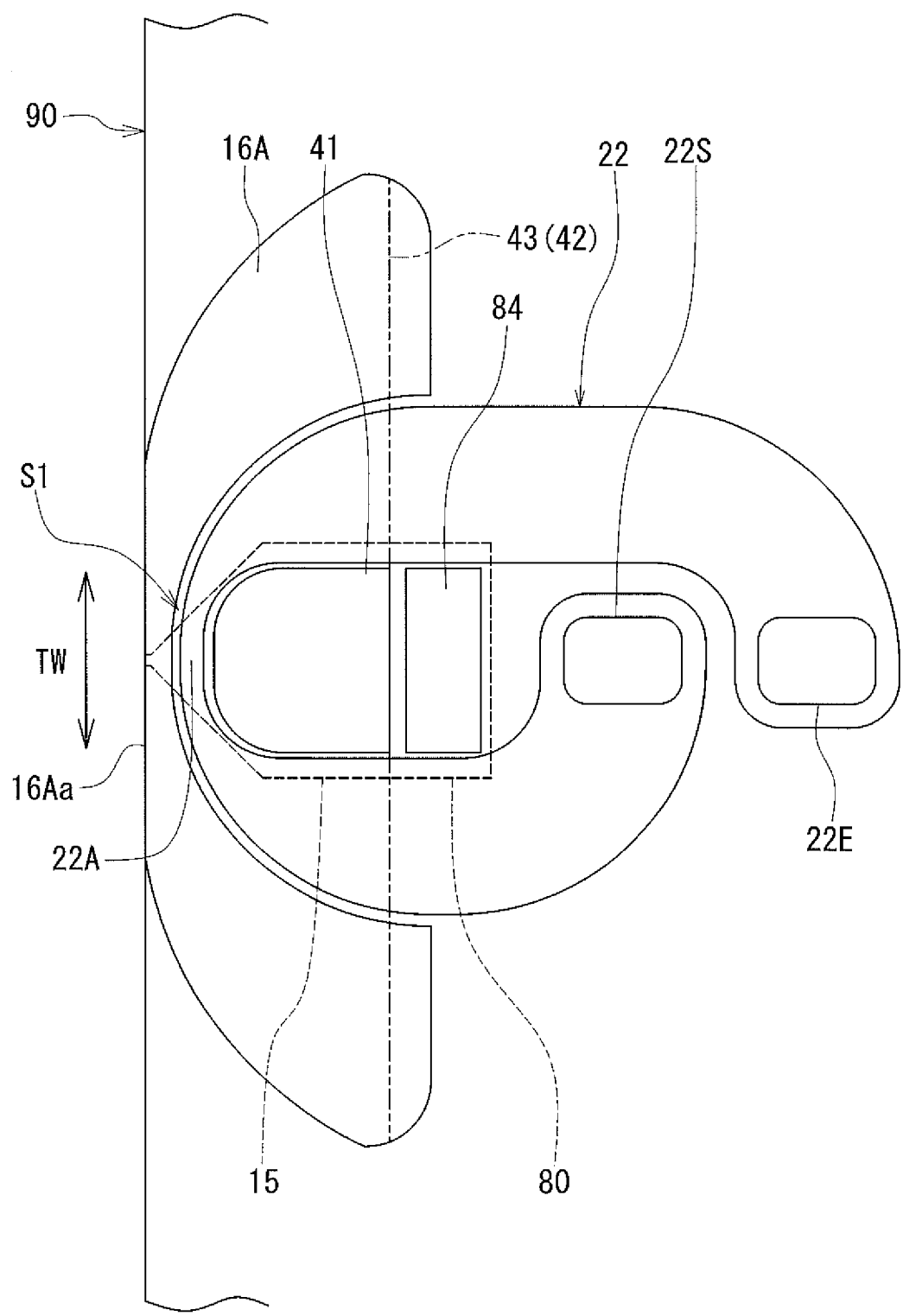
FIG. 6 is a plan view showing a second layer of the first portion of the coil of the magnetic head according to the first embodiment of the invention.

Preferred embodiments of the present invention will now be described in detail with reference to the drawings. First, reference is made to FIG. 1 to FIG. 6 to describe the configuration of a magnetic head according to a first embodiment of the invention. FIG. 1 is a cross-sectional view showing the magnetic head according to the present embodiment. The arrow with the symbol T in FIG. 1 indicates the direction of travel of a recording medium. FIG. 2 is a front view showing the medium facing surface of the magnetic head according to the present embodiment. FIG. 3 is a plan view showing a second portion of a coil of the magnetic head according to the present embodiment. FIG. 4 is a plan view showing a main pole, an expansion member and a heater of the magnetic head according to the present embodiment. FIG. 5 is a plan view showing a first layer of a first portion of the coil of the magnetic head according to the present embodiment. FIG. 6 is a plan view showing a second layer of the first portion of the coil of the magnetic head according to the present embodiment. The arrow with the symbol TW in each of FIG. 2 to FIG. 6 indicates the track width direction.

The magnetic head for perpendicular magnetic recording (hereinafter simply referred to as the magnetic head) according to the present embodiment is for use in, for example, a magnetic disk drive and is in the form of a slider to fly over the surface of a rotating recording medium 100. As shown in FIG. 1, the magnetic head (the slider) has a medium facing surface 90 facing the recording medium 100. The medium facing surface 90 has an air inflow end (a leading end) and an air outflow end (a trailing end). The slider is designed to slightly fly over the surface of the recording medium 100 by means of an airflow that comes from the leading end into the space between the medium facing surface 90 and the recording medium 100.

Here, the side of the positions closer to the leading end relative to a reference position will be defined as the leading side, and the side of the positions closer to the trailing end relative to the reference position will be defined as the trailing side. The leading side is the rear side in the direction T of travel of the recording medium 100 relative to the slider. The trailing side is the front side in the direction T of travel of the recording medium 100 relative to the slider.

As shown in FIG. 1 and FIG. 2, the magnetic head includes a substrate 1 formed of a ceramic material such as aluminum oxide-titanium carbide ($Al_2O_3$—TiC) and having a top surface 1a, an insulating layer 71 formed of an insulating material and disposed on the top surface 1a of the substrate 1, a heater 72 disposed on the insulating layer 71, and an insulating layer 73 formed of an insulating material and disposed to cover the insulating layer 71 and the heater 72. The insulating layers 71 and 73 are formed of alumina ($Al_2O_3$), for example. The heater 72 will be described in detail later.

The magnetic head further includes a read head unit 8 located on the trailing side or the front side in the direction T of travel of the recording medium 100 relative to the insulating layer 73. The read head unit 8 includes a first read shield layer 3 formed of a magnetic material and disposed on the insulating layer 73, a first read shield gap film 4 which is an insulating film disposed to cover the first read shield layer 3, a magnetoresistive (MR) element 5 serving as a read element disposed on the first read shield gap film 4, a second read shield gap film 6 which is an insulating film disposed on the MR element 5, and a second read shield layer 7 formed of a magnetic material and disposed on the second read shield gap film 6.

An end of the MR element 5 is located in the medium facing surface 90. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The magnetic head further includes a nonmagnetic layer 74 formed of a nonmagnetic material and disposed on the second read shield layer 7, a middle shield layer 75 formed of a magnetic material and disposed on the nonmagnetic layer 74, and a nonmagnetic layer 76 formed of a nonmagnetic material and disposed around the read head unit 8, the nonmagnetic layer 74 and the middle shield layer 75. The nonmagnetic layers 74 and 76 are formed of alumina, for example.

The magnetic head further includes a nonmagnetic layer 77 formed of a nonmagnetic material and disposed on the middle shield layer 75 and the nonmagnetic layer 76, a contact sensor 78 disposed on the nonmagnetic layer 77, and a nonmagnetic layer 79 formed of a nonmagnetic material and disposed to cover the nonmagnetic layer 77 and the contact sensor 78. The nonmagnetic layers 77 and 79 are formed of alumina, for example. The contact sensor 78 will be described in detail later.

The magnetic head further includes a write head unit 9 disposed on the nonmagnetic layer 79. The middle shield layer 75 has the function of shielding the MR element 5 from magnetic fields generated in the write head unit 9. The write head unit 9 includes a coil, a main pole 15, a first shield 16A, a second shield 16B, two side shields 16C and 16D, and a gap part 17.

The coil produces a magnetic field corresponding to data to be written on the recording medium 100. The coil includes a first portion 20 and a second portion 10. The first portion 20 and the second portion 10 are both formed of a conductive material such as copper. The first portion 20 and the second portion 10 are connected in series or in parallel. The main pole 15 has an end face 15a located in the medium facing surface 90. The main pole 15 allows a magnetic flux corresponding to the magnetic field produced by the coil to pass, and produces a write magnetic field for writing data on the recording medium 100 by means of a perpendicular magnetic recording system. Consequently, a magnetic flux is produced from the end face 15a of the main pole 15 and magnetizes a portion of the recording medium 100. FIG. 1 shows a cross section that intersects the end face 15a of the main pole 15 located in the medium facing surface 90 and that is perpendicular to the medium facing surface 90 and to the top surface 1a of the substrate 1 (this cross section will hereinafter be referred to as the main cross section).

Each of the shields 16A, 16B, 16C and 16D is formed of a magnetic material. Examples of materials that can be used for the shields 16A, 16B, 16C and 16D include CoFeN, CoNiFe, NiFe, and CoFe.

The first shield 16A is located on the trailing side or the front side in the direction T of travel of the recording medium 100 relative to the main pole 15. The second shield 16B is located on the leading side or the rear side in the direction T of travel of the recording medium 100 relative to the main pole 15. The two side shields 16C and 16D are located on opposite sides of the main pole 15 in the track width direction TW and magnetically couple the first shield 16A and the second shield 16B to each other.

As shown in FIG. 1 and FIG. 2, the first shield 16A has an end face 16Aa located on the front side in the direction T of travel of the recording medium 100 relative to the end face 15a of the main pole 15, and an inclined surface 16Ab, which is the bottom surface. The inclined surface 16Ab will be described in detail later. As shown in FIG. 2, the second shield 16B has an end face 16Ba located on the rear side in the direction T of travel of the recording medium 100 relative to the end face 15a of the main pole 15. The two side shields 16C and 16D have two end faces 16Ca and 16Da located on opposite sides of the end face 15a of the main pole 15 in the track width direction TW. In the medium facing surface 90, the end faces 16Aa, 16Ba, 16Ca and 16Da of the shields 16A, 16B, 16C and 16D are arranged to wrap around the end face 15a of the main pole 15.

The write head unit 9 further includes a first return path section 40 and a second return path section 30. The first and second return path sections 40 and 30 are each formed of a magnetic material. Examples of materials that can be used for the first and second return path sections 40 and 30 include CoFeN, CoNiFe, NiFe, and CoFe. The first return path section 40 and the second return path section 30 are disposed to be in alignment with each other in a direction perpendicular to the top surface 1a of the substrate 1 with the main pole 15 interposed therebetween. The first return path section 40 is located on the front side in the direction T of travel of the recording medium 100 relative to the main pole 15, and connects the first shield 16A and part of the main pole 15 located away from the medium facing surface 90 to each other, thereby magnetically coupling the first shield 16A and the main pole 15 to each other. The second return path section 30 is located on the rear side in the direction T of travel of the recording medium 100 relative to the main pole 15, and connects the second shield 16B and part of the main pole 15 located away from the medium facing surface 90 to each other, thereby magnetically coupling the second shield 16B and the main pole 15 to each other.

The second return path section 30 includes a second yoke layer 31 and a second connecting portion 32. The second connecting portion 32 includes magnetic layers 33 and 34. The magnetic layer 33 lies on the nonmagnetic layer 79. The second yoke layer 31 and the magnetic layer 34 both lie on the magnetic layer 33. The magnetic layer 34 is located near the medium facing surface 90. The second yoke layer 31 is located farther from the medium facing surface 90 than is the magnetic layer 34. As shown in FIG. 3, the second portion 10 of the coil is wound approximately two turns around the second yoke layer 31. Each of the magnetic layers 33 and 34 has an end face located in the medium facing surface 90.

The second yoke layer 31 is in contact with a portion of the main pole 15 located away from the medium facing surface 90. More specifically, the second yoke layer 31 is in contact with a portion of a bottom end of the main pole 15 located away from the medium facing surface 90, which will be described later.

The magnetic head further includes: an insulating layer 51 formed of an insulating material, lying on the nonmagnetic layer 79 and surrounding the magnetic layer 33; an insulating film 52 formed of an insulating material and isolating the second portion 10 from the second yoke layer 31 and the magnetic layers 33 and 34; an insulating layer 53 formed of an insulating material and disposed in the space between adjacent turns of the second portion 10; and an insulating layer 54 formed of an insulating material and disposed around the second portion 10, the second yoke layer 31 and the magnetic layer 34. The top surfaces of the second portion 10, the second yoke layer 31, the magnetic layer 34, the insulating film 52, and the insulating layers 53 and 54 are even with each other. The magnetic head further includes an insulating layer 55 formed of an insulating material and lying on the second portion 10, the insulating film 52 and the insulating layers 53 and 54. The insulating layers 51, 54 and 55 and the insulating film 52 are formed of alumina, for example. The insulating layer 53 is formed of a photoresist, for example.

The second shield 16B lies on the magnetic layer 34. The magnetic head further includes a nonmagnetic layer 56 formed of a nonmagnetic material. The nonmagnetic layer 56 lies on the insulating layer 55 and surrounds the second shield 16B. The nonmagnetic layer 56 is formed of alumina, for example.

The main pole 15 has the end face 15a, a top surface 15T (see FIG. 1) lying at the front end in the direction T of travel of the recording medium 100, a bottom end 15L (see FIG. 1) opposite to the top surface 15T, and first and second side parts (see FIG. 2) that are opposite to each other in the track width direction TW. The side shield 16C has a first sidewall opposed to the first side part of the main pole 15. The side shield 16D has a second sidewall opposed to the second side part of the main pole 15.

The gap part 17 includes a first portion and a second portion. The magnetic head further includes a first gap layer 19 formed of a nonmagnetic material and including a portion that constitutes the first portion of the gap part 17, and a second gap layer 18 formed of a nonmagnetic material and including a portion that constitutes the second portion of the gap part 17. The first portion of the gap part 17 is located between the main pole 15 and the first shield 16A. The second portion of the gap part 17 is located between the main pole 15 and each of the second shield 16B and the side shields 16C and 16D.

The side shields 16C and 16D are disposed on the second shield 16B. The second gap layer 18 is arranged to extend along the sidewalls of the side shields 16C and 16D, the top surface of the second shield 16B and the top surface of the nonmagnetic layer 56. The nonmagnetic material used to form the second gap layer 18 may be an insulating material or a nonmagnetic metal material. Alumina is an example of an insulating material that can be used to form the second gap layer 18. Ru is an example of a nonmagnetic metal material that can be used to form the second gap layer 18.

The main pole 15 lies on the second shield 16B and the nonmagnetic layer 56 such that the second gap layer 18 is interposed between the main pole 15 and the top surfaces of the second shield 16B and the nonmagnetic layer 56. As shown in FIG. 2, the second gap layer 18 is interposed also between the main pole 15 and the side shields 16C and 16D.

A portion of the bottom end 15L of the main pole 15 located away from the medium facing surface 90 is in contact with the top surface of the second yoke layer 31. The main pole 15 may be formed of, for example, a magnetic metal material containing any of Ni, Fe and Co, such as NiFe, CoNiFe, or CoFe. The shape of the main pole 15 will be described in detail later.

The magnetic head further includes an expansion member 80 that is located farther from the medium facing surface 90 than is the main pole 15 and lies on the insulating film 52 and the insulating layer 54. The expansion member 80 is adjacent to the main pole 15 in a direction perpendicular to the medium facing surface 90. In the example shown in FIG. 1, the expansion member 80 is in contact with the main pole 15. However, there may be an insulating film interposed between the main pole 15 and the expansion member 80.

The expansion member 80 has a linear expansion coefficient higher than that of the main pole 15. In the present embodiment, the expansion member 80 is formed of a nonmagnetic metal material. Where the main pole 15 is formed of a magnetic metal material containing any of Ni, Fe and Co, the nonmagnetic metal material used to form the expansion member 80 has a linear expansion coefficient higher than that of each of Ni, Fe and Co. Each of Ni, Fe and Co has a linear expansion coefficient in the range of 12 to $13 \times 10^{-6}/°$ C. The nonmagnetic metal material used to form the expansion member 80 need only have a linear expansion coefficient clearly higher than that of each of Ni, Fe and Co mentioned above. Examples of such a material include Cu, Al, Ag, and Sn. Cu has a linear expansion coefficient in the range of 16 to $17 \times 10^{-6}/°$ C. Al has a linear expansion coefficient in the range of 23 to $24 \times 10^{-6}/°$ C. Ag has a linear expansion coefficient in the range of 19 to $20 \times 10^{-6}/°$ C. Sn has a linear expansion coefficient in the range of 23 to $27 \times 10^{-6}1°$ C.

The magnetic head further includes a nonmagnetic layer 60 formed of a nonmagnetic material and disposed around the main pole 15, the side shields 16C and 16D and the expansion member 80. The nonmagnetic layer 60 is formed of alumina, for example.

The magnetic head further includes an insulating layer 81 formed of an insulating material. The insulating layer 81 lies on the top surfaces of the expansion member 80 and the nonmagnetic layer 60. The insulating layer 81 is formed of alumina, for example.

The magnetic head further includes a heater 82 disposed on the insulating layer 81, an insulating layer 83 formed of an insulating material and covering the insulating layer 81 and the heater 82, and a metal portion 84 formed of a metal material and adjacent to the expansion member 80. The insulating layer 83 is formed of alumina, for example. The metal material used to form the metal portion 84 may be a magnetic metal material or a nonmagnetic metal material. In the case of forming the metal portion 84 of a magnetic metal material, any of CoFeN, CoNiFe, NiFe and CoFe, for example, may be selected. In the case of forming the metal portion 84 of a nonmagnetic metal material, any of Cu, Al, Ag and Sn, for example, may be selected as in the case of the expansion member 80. The same nonmagnetic metal material may be used to form the metal portion 84 and the expansion member 80.

The heater 82 is to heat the expansion member 80, and is located away from the medium facing surface 90. The metal portion 84 is disposed with the heater 82 interposed between the expansion member 80 and the metal portion 84. The insulating layer 83 is interposed between the heater 82 and the metal portion 84. In the example shown in FIG. 1, the bottom surface of the metal portion 84 around the heater 82 is in contact with the top surface of the expansion member 80. The metal portion 84 may be in non-contact with the expansion member 80. In such a case, the insulating layers 81 and 83 are interposed between the expansion member 80 and the metal portion 84. The heater 82 will be described in more detail later.

The first return path section 40 includes a first yoke layer 41 and a first connecting portion 42. The first connecting portion 42 is formed of a single magnetic layer 43. The first yoke layer 41 is located away from the medium facing surface 90 and in contact with a portion of the main pole 15 located away from the medium facing surface 90. More specifically, the first yoke layer 41 is in contact with a portion of the top surface 15T of the main pole 15 located away from the medium facing surface 90. The metal portion 84 is located farther from the medium facing surface 90 than is the first yoke layer 41 and separated from the first return path section 40 and the second return path section 30.

In the case of employing a magnetic metal material as the metal material to form the metal portion 84, the metal portion 84 and the first yoke layer 41 may be formed of one and the same magnetic metal material. In such a case, it is possible to form the metal portion 84 and the first yoke layer 41 simultaneously. The first yoke layer 41 and the metal portion 84 are disposed such that an imaginary plane passing through the first yoke layer 41 and the metal portion 84 can lie parallel to the top surface 1a of the substrate 1.

The magnetic head further includes an insulating layer 58 formed of an insulating material, located away from the medium facing surface 90 and lying on a portion of the top surface 15T of the main pole 15. The insulating layer 58 is formed of alumina, for example.

The first portion 20 of the coil includes a first layer 21 and a second layer 22. The first layer 21 lies on the insulating layer 58. As shown in FIG. 5, the first layer 21 is wound approximately one turn around the first yoke layer 41 and the metal portion 84. The magnetic head further includes an insulating layer 59 lying on the first layer 21. The insulating layer 59 is formed of alumina, for example.

The first gap layer 19 is disposed to cover the main pole 15, the first layer 21 and the insulating layers 58 and 59. The first gap layer 19 is formed of alumina, for example. The insulating layer 59 may be omitted. In such a case, the first gap layer 19 covers the top surface of the first layer 21.

The magnetic head further includes an insulating film 61 formed of an insulating material and lying on the first gap layer 19, and an insulating film 62 formed of an insulating material and lying on the insulating film 61. Each of the insulating films 61 and 62 has an end closest to the medium facing surface 90. The end of the insulating film 61 is located at a distance from the medium facing surface 90. The end of the insulating film 62 is located farther from the medium facing surface 90 than is the end of the insulating film 61. The insulating films 61 and 62 are formed of alumina, for example.

The first shield 16A lies on the side shields 16C and 16D, the first gap layer 19 and the insulating films 61 and 62. In the medium facing surface 90, a portion of the end face 16Aa of the first shield 16A is spaced from the end face 15a of the main pole 15 by a predetermined distance created by the thickness of the first gap layer 19. The thickness of the first gap layer 19 preferably falls within the range of 5 to 60 nm, and may be 30 to 60 nm, for example. The end face 15a of the main pole 15 has a side adjacent to the first gap layer 19. This side of the end face 15a defines the track width.

Each of the insulating layers 58 and 59 has an end face facing toward the inclined surface 16Ab of the first shield 16A. The distance from the medium facing surface 90 to an arbitrary point on the end face of each of the insulating layers 58 and 59 increases with increasing distance from the arbitrary point to the top surface 1a of the substrate 1.

The second layer 22 is located above the first layer 21. As shown in FIG. 6, the second layer 22 is wound one turn around the first yoke layer 41 and the metal portion 84. The magnetic head further includes an insulating film 63 formed of an insulating material and a nonmagnetic layer 64 formed of a nonmagnetic material. The insulating film 63 isolates the second layer 22 from the first shield 16A, the first yoke layer 41 and the insulating film 62. The nonmagnetic layer 64 is disposed around the first layer 21, the second layer 22, the first shield 16A, the first yoke layer 41 and the metal portion 84. The insulating film 63 and the nonmagnetic layer 64 are formed of alumina, for example. The top surfaces of the first shield 16A, the second layer 22, the first yoke layer 41, the metal portion 84, the insulating film 63 and the nonmagnetic layer 64 are even with each other.

The magnetic head further includes an insulating layer 65 formed of an insulating material and disposed over the top surfaces of the second layer 22 and the insulating film 63. The insulating layer 65 is formed of alumina, for example. The magnetic layer 43 is disposed over the first shield 16A, the first yoke layer 41 and the insulating layer 65, and connects the first shield 16A and the first yoke layer 41 to each other.

The magnetic head further includes a nonmagnetic layer 66 formed of a nonmagnetic material and disposed around the magnetic layer 43, and a protective layer 70 formed of a nonmagnetic material and disposed to cover the write head unit 9. The nonmagnetic layer 66 and the protective layer 70 are formed of, for example, an inorganic insulating material such as alumina.

As has been described, the magnetic head according to the present embodiment includes the medium facing surface 90, the read head unit 8, the write head unit 9, the heater 72, and the contact sensor 78. The read head unit 8 is located on the leading side or the rear side in the direction T of travel of the recording medium 100 relative to the write head unit 9.

The heater 72 is located on the leading side or the rear side in the direction T of travel of the recording medium 100 relative to the read head unit 8. The heater 72 is provided for allowing part of the medium facing surface 90, mainly the end face of the read head unit 8 located in the medium facing surface 90, to protrude toward the recording medium 100. The heater 72 includes a line-shaped conductor that generates heat when energized. The line-shaped conductor may be meandering in shape. The magnetic head according to the present embodiment includes a pair of leads (not illustrated) that are connected to opposite ends of the line-shaped conductor. The line-shaped conductor is configured to be energized through the pair of leads to thereby generate heat. For example, the line-shaped conductor is formed of a film of NiCr or a layered film consisting of Ta, NiCu, and Ta films.

The heat generated by the line-shaped conductor is transferred to a plurality of components of the magnetic head located near the heater 72, such as the read shield layers 3 and 7 and the middle shield layer 75. The plurality of components of the magnetic head located near the heater 72 are thus heated by the heater 72. These components expand by being heated. As a result, part of the medium facing surface 90, mainly the end face of the read head unit 8, protrudes toward the recording medium 100.

The contact sensor 78 is disposed between the read head unit 8 and the write head unit 9. The contact sensor 78 is provided for detecting contact of part of the medium facing surface 90 with the recording medium 100. The contact sensor 78 is a resistor that varies in resistance with a change in its own temperature upon contact of part of the medium facing surface 90 with the recording medium 100. The resistor extends in the track width direction TW. The magnetic head according to the present embodiment includes a pair of leads (not illustrated) that are connected to opposite ends of the resistor. The resistor is formed of a metal material or a semiconductor material that varies in resistance at a relatively high rate with respect to a change in temperature, i.e., that has a relatively high temperature coefficient of resistance. Specifically, the material for the resistor may be NiFe, W, Cu, Ni, or Pt, for example.

Upon contact of part of the medium facing surface 90 with the recording medium 100, the frictional heat resulting from the contact raises the temperature of the medium facing surface 90 at and in the vicinity of the part in contact with the recording medium 100. Such a rise in temperature also raises the temperature of the contact sensor 78 (the resistor) itself. As a result, the contact sensor 78 varies in resistance. It is thus possible to detect contact of part of the medium facing surface 90 with the recording medium 100 by measuring the resistance of the contact sensor 78 through the pair of leads.

The write head unit 9 includes the coil including the first portion 20 and the second portion 10, the main pole 15, the first shield 16A, the second shield 16B, the two side shields 16C and 16D, the gap part 17, the first return path section 40 and the second return path section 30, the expansion member 80, the heater 82, and the metal portion 84. The gap part 17 includes the first portion formed of a portion of the first gap layer 19 and the second portion formed of a portion of the second gap layer 18. The first return path section 40 and the second return path section 30 are in alignment with each other in the direction perpendicular to the top surface 1a of the substrate 1 with the main pole 15 interposed therebetween.

The first return path section 40 includes the first yoke layer 41 and the first connecting portion 42. The first connecting portion 42 is formed of the magnetic layer 43 and located on the front side in the direction T of travel of the recording medium 100 relative to the first shield 16A and the first yoke layer 41. The first connecting portion 42 (the magnetic layer 43) connects the first shield 16A and the first yoke layer 41 to each other so that a first space S1 is defined by the main pole 15, the first portion of the gap part 17 (part of the gap layer 19), the first shield 16A and the first return path section 40.

The second return path section 30 includes the second yoke layer 31 and the second connecting portion 32. The second connecting portion 32 includes the magnetic layers 33 and 34 and is located on the rear side in the direction T of travel of the recording medium 100 relative to the second shield 16B and the second yoke layer 31. The second connecting portion 32 (the magnetic layers 33 and 34) connects the second shield 16B and the second yoke layer 31 to each other so that a second space S2 is defined by the main pole 15, the second portion of the gap part 17 (part of the gap layer 18), the second shield 16B and the second return path section 30.

The expansion member 80 is located farther from the medium facing surface 90 than is the main pole 15, and is adjacent to the main pole 15 in the direction perpendicular to the medium facing surface 90. The heater 82 and the metal portion 84 are located on the front side in the direction T of travel of the recording medium 100 relative to the expansion member 80. The expansion member 80 and the metal portion 84 define therebetween a receiving space 150 for receiving at least part of the heater 82. In the present embodiment, the metal portion 84 has a recess 84a that opens in the bottom surface of the metal portion 84. The recess 84a extends in the track width direction TW. The receiving space 150 is a space located between the recess 84a and the top surface of the expansion member 80.

At least part of the heater 82 is received in the receiving space 150. The heater 82 includes a line-shaped conductor 82A that generates heat when energized. As shown in FIG. 4, the line-shaped conductor 82A includes two linear portions 82A1 and 82A2 extending linearly in the track width direction TW, and a connecting portion 82A3 connecting one end of the linear portion 82A1 to one end of the linear portion 82A2. The connecting portion 82A3 is U-shaped, for example. The linear portion 82A2 is located farther from the medium facing surface 90 than is the linear portion 82A1. A part of each of the linear portions 82A1 and 82A2 is located in the receiving space 150. One end and the other end of the linear portion 82A1, one end and the other end of the linear portion 82A2, and the connecting portion 82A3 are located outside the receiving space 150.

The magnetic head according to the present embodiment includes a pair of leads 87 and 88 connected to the other end of the linear portion 82A1 and the other end of the linear portion 82A2, respectively. The line-shaped conductor 82A is configured to be energized through the pair of leads 87 and 88 to thereby generate heat. In FIG. 4, the boundary between the linear portion 82A1 and the lead 87 and the boundary between the linear portion 82A2 and the lead 88 are shown by broken lines. For example, the line-shaped conductor 82A is formed of a film of NiCr or a layered film consisting of Ta, NiCu, and Ta films. The function of the heater 82 will be described in detail later.

The magnetic head further includes an insulating portion formed of an insulating material and insulating the line-shaped conductor 82A from the expansion member 80 and the metal portion 84. The insulating portion is constituted of a portion of the insulating layer 81 that is located between the line-shaped conductor 82A and the expansion member 80 and a portion of the insulating layer 83 that is located between the line-shaped conductor 82A and the metal portion 84.

Figure 7:
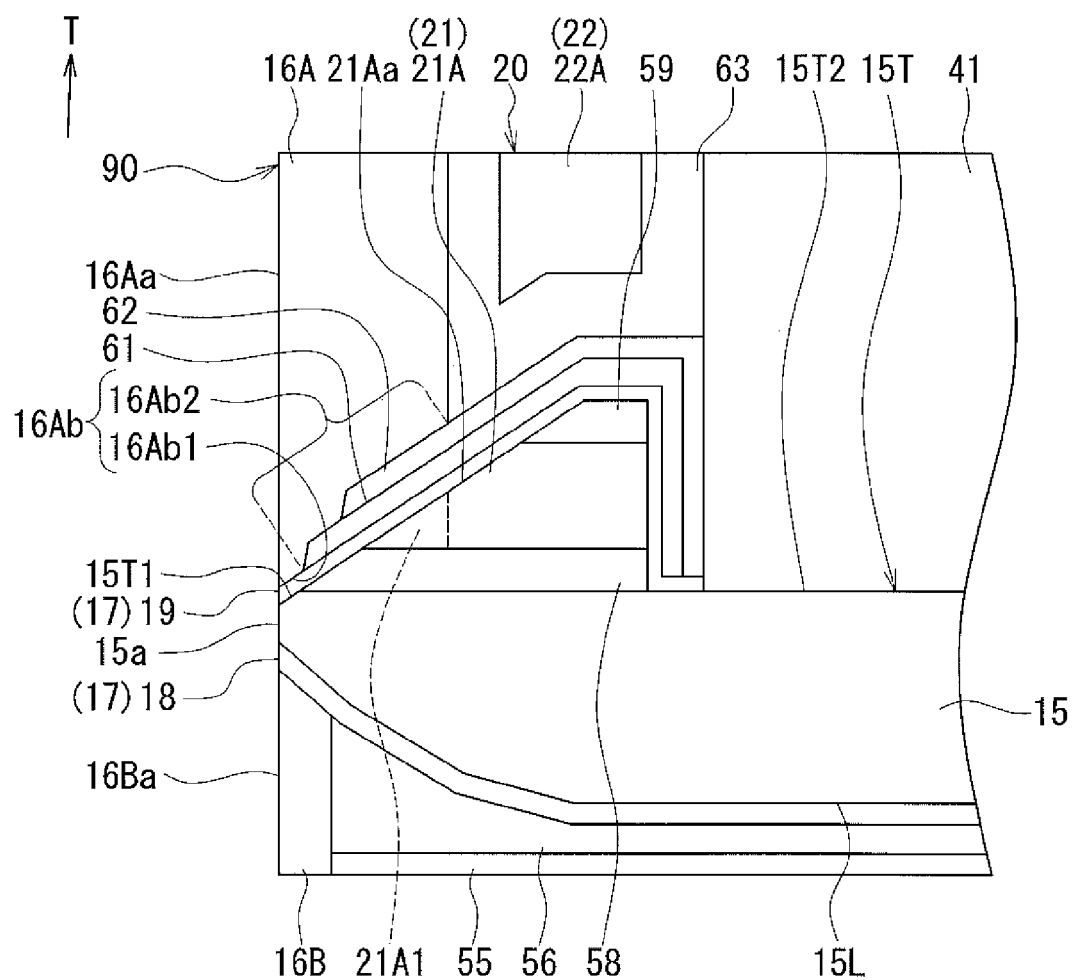
FIG. 7 is a cross-sectional view showing a portion of the magnetic head according to the first embodiment of the invention.

The first portion 20 and the second portion 10 of the coil will now be described in detail with reference to FIG. 3 to FIG. 7. FIG. 7 is a cross-sectional view of a portion of the magnetic head according to the present embodiment. Note that FIG. 7 shows the main cross section. As shown in FIG. 3, the second portion 10 is wound approximately two turns around the second yoke layer 31. The second portion 10 includes two coil elements 10A and 10B extending to pass through the second space S2. Note that the coil elements refer to part of the coil winding. The coil elements 10A and 10B are arranged in this order in the direction perpendicular to the medium facing surface 90, the coil element 10A being closer to the medium facing surface 90. The second portion 10 has a coil connection 10S electrically connected to the first portion 20.

The coil elements 10A and 10B are located near the main pole 15 to pass between the magnetic layer 34 and the second yoke layer 31. The coil elements 10A and 10B correspond to the at least one second coil element of the present invention. Since the second portion 10 is part of the coil, the coil can be said to include the second coil elements 10A and 10B.

As shown in FIG. 5, the first layer 21 of the first portion 20 is wound approximately one turn around the first yoke layer 41 and the metal portion 84. The first layer 21 includes a coil element 21A extending to pass between the first shield 16A and the first yoke layer 41, in particular, within the first space S1. As shown in FIG. 7, the coil element 21A has an end face 21Aa facing toward the inclined surface 16Ab of the first shield 16A. The distance from the medium facing surface 90 to an arbitrary point on the end face 21Aa of the coil element 21A increases with increasing distance from the arbitrary point to the top surface 1*a* of the substrate 1. The first layer 21 has a coil connection 21E electrically connected to the second layer 22.

As shown in FIG. 6, the second layer 22 of the first portion 20 is wound one turn around the first yoke layer 41 and the metal portion 84. The second layer 22 includes a coil element 22A extending to pass between the first shield 16A and the first yoke layer 41, in particular, within the first space S1. The second layer 22 has a coil connection 22S penetrating the insulating layer 59 and the insulating films 61 to 63 and electrically connected to the coil connection 21E of the first layer 21, and a coil connection 22E electrically connected to the coil connection 10S of the second portion 10.

The coil connection 22E is electrically connected to the coil connection 10S via a lead layer 85 and a connecting layer 86 shown in FIG. 3 to FIG. 5. The lead layer 85 lies on the insulating layer 55 at a position farther from the medium facing surface 90 than the expansion member 80, penetrates the insulating layer 55 and is electrically connected to the coil connection 10S. The connecting layer 86 lies on the lead layer 85. The coil connection 22E penetrates the insulating layer 59 and the insulating films 61 to 63 and is electrically connected to the connecting layer 86. The lead layer 85 and the connecting layer 86 are each formed of a conductive material such as copper. In the example shown in FIG. 3 to FIG. 6, the first portion 20 and the second portion 10 are connected in series.

The coil elements 21A and 22A correspond to the at least one first coil element of the present invention. Since the first layer 21 and the second layer 22 are part of the coil, the coil can be said to include the first coil elements 21A and 22A.

Reference is now made to FIG. 3, FIG. 5 and FIG. 6 to describe the shapes of the first shield 16A, the second shield 16B, the first yoke layer 41, the second yoke layer 31 and the magnetic layers 33, 34 and 43 in detail. As shown in FIG. 5 and FIG. 6, the first shield 16A includes a central portion, and two side portions located on opposite sides of the central portion in the track width direction TW. The central portion includes the end face 16Aa of the first shield 16A, and is disposed to intersect the main cross section. The two side portions are greater than the central portion in maximum length in the direction perpendicular to the medium facing surface 90.

As shown in FIG. 3, the magnetic layer 34 includes a central portion, and two side portions located on opposite sides of the central portion in the track width direction TW. The central portion includes the end face of the magnetic layer 34 located in the medium facing surface 90, and is disposed to intersect the main cross section. The two side portions are greater than the central portion in maximum length in the direction perpendicular to the medium facing surface 90. Although not illustrated, the second shield 16B also includes a central portion and two side portions. The central portion includes the end face 16Ba of the second shield 16B and intersects the main cross section.

The first shield 16A, the first yoke layer 41 and the magnetic layer 43 constitute a first coil surrounding portion shaped to surround a part of the first portion 20. The first coil surrounding portion has a first end face constituted of the end face 16Aa of the first shield 16A and the end face of the magnetic layer 43. The first coil surrounding portion defines a space (hereinafter referred to as the first coil receiving space) whose width in the track width direction TW increases with increasing distance from the medium facing surface 90. As shown in FIG. 5 and FIG. 6, the width of the first end face in the track width direction TW is smaller than the maximum width of the first coil receiving space in the track width direction TW.

Likewise, the second shield 16B, the second yoke layer 31 and the magnetic layers 33 and 34 constitute a second coil surrounding portion shaped to surround a part of the second portion 10. The second coil surrounding portion has a second end face constituted of the end face 16Ba of the second shield 16B and the respective end faces of the magnetic layers 33 and 34. The second coil surrounding portion defines a space (hereinafter referred to as the second coil receiving space) whose width in the track width direction TW increases with increasing distance from the medium facing surface 90. As shown in FIG. 3, the width of the second end face in the track width direction TW is smaller than the maximum width of the second coil receiving space in the track width direction TW.

The shape of the main pole 15 will now be described in detail with reference to FIG. 2, FIG. 4 and FIG. 7. As shown in FIG. 4, the main pole 15 includes a track width defining portion 15A and a wide portion 15B. The track width defining portion 15A has an end face located in the medium facing surface 90, and an end opposite to the end face. The wide portion 15B is connected to the end of the track width defining portion 15A. As shown in FIG. 2 and FIG. 7, the main pole 15 has the top surface 15T lying at the front end in the direction T of travel of the recording medium 100, the bottom end 15L opposite to the top surface 15T, the first side part, and the second side part. The width of the top surface 15T in the track width direction TW is greater in the wide portion 15B than in the track width defining portion 15A.

In the track width defining portion 15A, the width of the top surface 15T in the track width direction TW is generally constant regardless of distance from the medium facing surface 90. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 90, then becoming constant. Here, the length of the track width defining portion 15A in the direction perpendicular to the medium facing surface 90 will be referred to as the neck height. The neck height falls within the range of 0 to 0.3 µm, for example. A zero neck height means that the track width defining portion 15A is not provided and an end face of the wide portion 15B is thus located in the medium facing surface 90.

The top surface 15T includes a first inclined portion 15T1 and a first flat portion 15T2, the first inclined portion 15T1 being closer to the medium facing surface 90. The first inclined portion 15T1 has a first end located in the medium facing surface 90 and a second end opposite to the first end. The first flat portion 15T2 is connected to the second end of the first inclined portion 15T1. The first inclined portion 15T1 is inclined such that its second end is located on the front side in the direction T of travel of the recording medium 100 relative to its first end. The first flat portion 15T2 extends in a direction substantially perpendicular to the medium facing surface 90.

The bottom end 15L includes a second inclined portion and a second flat portion, the second inclined portion being closer to the medium facing surface 90. The second inclined portion has a first end located in the medium facing surface 90 and a second end opposite to the first end. The second inclined portion may be an edge formed by two intersecting planes, or may be a plane connecting two planes to each other. The second flat portion is a plane connected to the second end of the second inclined portion. The second inclined portion is inclined such that its second end is located on the rear side in the direction T of travel of the recording medium 100 relative to its first end. The second flat portion extends in a direction substantially perpendicular to the medium facing surface 90.

The end face 15a of the main pole 15 located in the medium facing surface 90 has a first side adjacent to the first gap layer 19, a second side connected to one end of the first side, and a third side connected to the other end of the first side. The first side defines the track width. The position of an end of a record bit to be recorded on the recording medium 100 depends on the position of the first side. The end face 15a of the main pole 15 located in the medium facing surface 90 decreases in width in the track width direction TW with increasing distance from the first side, that is, with increasing proximity to the top surface 1a of the substrate 1. Each of the second side and the third side forms an angle of, for example, 7° to 17°, or preferably 10° to 15°, relative to the direction perpendicular to the top surface 1a of the substrate 1. The first side has a length in the range of 0.05 to 0.20 µm, for example.

The shapes of the inclined surface 16Ab and the coil element 21A will now be described in detail with reference to FIG. 7. As previously mentioned, the first shield 16A has the inclined surface 16Ab. The inclined surface 16Ab faces toward the top surface 15T of the main pole 15. The inclined surface 16Ab has a third end located in the medium facing surface 90 and a fourth end opposite to the third end. The inclined surface 16Ab is inclined such that the fourth end is located on the front side in the direction T of travel of the recording medium 100 relative to the third end.

The inclined surface 16Ab includes a first portion 16Ab1 that is opposed to the first inclined portion 15T1 of the top surface 15T with the first portion of the gap part 17 (part of the gap layer 19) interposed therebetween, and a second portion 16Ab2 that is contiguous with the first portion 16Ab1 and is located farther from the medium facing surface 90 than is the first portion 16Ab1. The coil element 21A includes a portion 21A1 that is located closer to the medium facing surface 90 than is the fourth end of the inclined surface 16Ab and interposed between the first flat portion 15T2 of the top surface 15T and the second portion 16Ab2 of the inclined surface 16Ab.

The first yoke layer 41 of the first return path section 40 is disposed such that the coil element 21A is interposed between the first yoke layer 41 and the inclined surface 16Ab. The insulating layer 58 is disposed between the coil element 21A and the first flat portion 15T2 of the top surface 15T. The insulating layer 59 lies on the coil element 21A. The first inclined portion 15T1 of the top surface 15T, the end face of the insulating layer 58, the end face 21Aa of the coil element 21A, and the end face of the insulating layer 59 are coplanar.

The minimum distance between the coil element 21A and the medium facing surface 90 falls within the range of 0.1 to 0.25 µm, for example. The minimum distance between the first yoke layer 41 and the medium facing surface 90 falls within the range of 0.7 to 1.2 µm, for example. In the main cross section, the length of the coil element 22A in the direction perpendicular to the medium facing surface 90 is about 0.4 µm, for example. The coil element 21A has a thickness in the range of 0.3 to 0.7 µm, for example.

The function and effects of the magnetic head according to the present embodiment will now be described. The magnetic head writes data on the recording medium 100 by using the write head unit 9 and reads data stored on the recording medium 100 by using the read head unit 8. In the write head unit 9, the coil including the first portion 20 and the second portion 10 produces magnetic fields corresponding to data to be written on the recording medium 100. A magnetic flux corresponding to the magnetic field produced by the first portion 20 passes through the first return path section 40 and the main pole 15. A magnetic flux corresponding to the magnetic field produced by the second portion 10 passes through the second return path section 30 and the main pole 15. Consequently, the main pole 15 allows the magnetic flux corresponding to the magnetic field produced by the first portion 20 and the magnetic flux corresponding to the magnetic field produced by the second portion 10 to pass.

The first portion 20 and the second portion 10 may be connected in series or in parallel. In either case, the first portion 20 and the second portion 10 are connected such that the magnetic flux corresponding to the magnetic field produced by the first portion 20 and the magnetic flux corresponding to the magnetic field produced by the second portion 10 flow in the same direction through the main pole 15.

The main pole 15 allows the magnetic fluxes corresponding to the magnetic fields produced by the coil to pass as mentioned above, and produces a write magnetic field for writing data on the recording medium 100 by means of the perpendicular magnetic recording system.

The shields 16A, 16B, 16C and 16D capture a disturbance magnetic field applied to the magnetic head from the outside thereof. This makes it possible to prevent the disturbance magnetic field from being intensively captured into the main pole 15 and thereby causing erroneous writing on the recording medium 100. The shields 16A, 16B, 16C and 16D also have the function of capturing a magnetic flux that is produced from the end face 15*a* of the main pole 15 and spreads in directions other than the direction perpendicular to the surface of the recording medium 100, and thereby preventing the magnetic flux from reaching the recording medium 100.

Furthermore, the shields 16A, 16B, 16C and 16D and the first and second return path sections 40 and 30 have the function of allowing a magnetic flux that has been produced from the end face 15*a* of the main pole 15 and has magnetized a portion of the recording medium 100 to flow back. More specifically, a portion of the magnetic flux that has been produced from the end face 15*a* of the main pole 15 and has magnetized the portion of the recording medium 100 flows back to the main pole 15 through the first shield 16A and the first return path section 40. Another portion of the magnetic flux that has been produced from the end face 15*a* of the main pole 15 and has magnetized the portion of the recording medium 100 flows back to the main pole 15 through the second shield 16B and the second return path section 30.

In the medium facing surface 90, the end faces 16Aa, 16Ba, 16Ca and 16Da of the shields 16A, 16B, 16C and 16D are arranged to wrap around the end face 15*a* of the main pole 15. The present embodiment thus makes it possible that, in regions on both the front side and the rear side in the direction T of travel of the recording medium 100 relative to the end face 15*a* of the main pole 15 and regions on opposite sides of the end face 15*a* of the main pole 15 in the track width direction TW, a magnetic flux that is produced from the end face 15*a* of the main pole 15 and spreads in directions other than the direction perpendicular to the surface of the recording medium 100 can be captured and thereby prevented from reaching the recording medium 100. Consequently, the present embodiment makes it possible to prevent the occurrence of a phenomenon that signals already written on one or more tracks in the neighborhood of a track targeted for writing are erased or attenuated during writing of a signal on the track targeted for writing (such a phenomenon will hereinafter be referred to as unwanted erasure).

Figure 8:
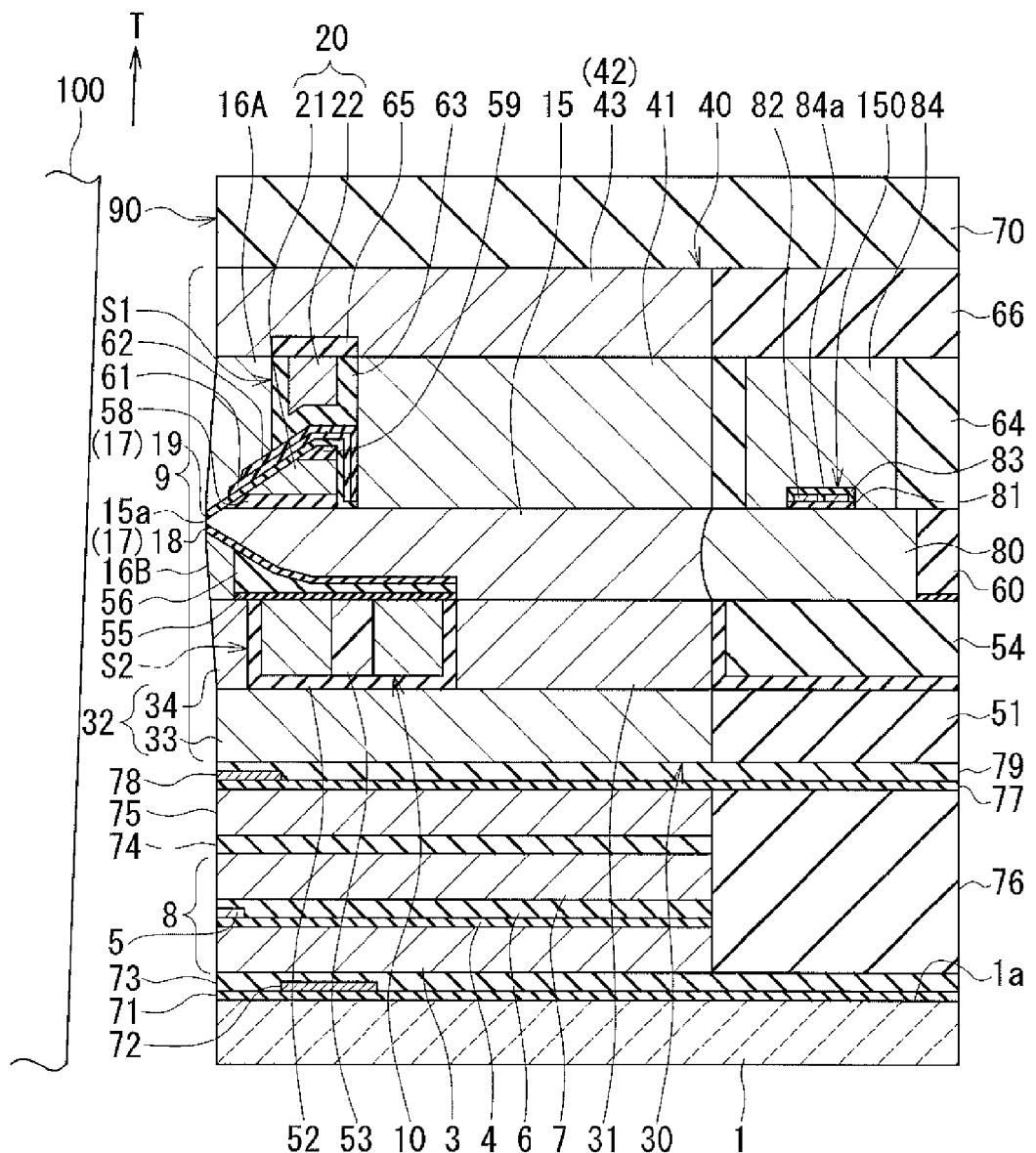
FIG. 8 is an explanatory diagram showing a protruded state of the end face of the main pole of the magnetic head according to the first embodiment of the invention.

The function of the heater 82 will now be described in detail. The line-shaped conductor 82A of the heater 82 generates heat when energized. The heat generated by the line-shaped conductor 82A is transferred to the expansion member 80. The expansion member 80 is thus heated by the heater 82. The expansion member 80 expands by being heated, and applies to the main pole 15 a force in the direction from the expansion member 80 toward the medium facing surface 90. As a result, the end face 15*a* of the main pole 15 located in the medium facing surface 90 protrudes toward the recording medium 100. FIG. 8 shows the state in which the end face 15*a* of the main pole 15 protrudes in this way. This reduces the distance from the end face 15*a* of the main pole 15 to the surface of the recording medium 100, thereby allowing for the enhancement of recording density.

Now, consider a magnetic head of a comparative example that does not include the expansion member 80 and the heater 82 but includes a substitute heater provided in the vicinity of the main pole 15. In the magnetic head of the comparative example, some components of the magnetic head other than the main pole 15, such as the first return path section 40, the second return path section 30 and the shields 16A, 16B, 16C and 16D, are also heated by the heater. It is therefore difficult for the magnetic head of the comparative example to allow the end face 15*a* of the main pole 15 to greatly protrude relative to its neighboring surroundings located in the medium facing surface 90. The magnetic head of the comparative example thus has a disadvantage that the distance from the end face 15*a* of the main pole 15 to the surface of the recording medium 100 cannot be sufficiently reduced and therefore it is not possible to achieve sufficiently high recording density. Further, for the magnetic head of the comparative example, the end face 15*a* of the main pole 15 does not always protrude by the greatest amount when compared with the other parts of the end face of the write head unit 9 located in the medium facing surface 90. If any part of the end face of the write head unit 9 other than the end face 15*a* of the main pole 15 protrudes by the greatest amount, there arises a problem that it is difficult to recognize and control the distance from the end face 15*a* of the main pole 15 to the surface of the recording medium 100. For the magnetic head provided with the shields 16A, 16B, 16C and 16D, in particular, the end faces 16Aa, 16Ba, 16Ca and 16Da of the shields 16A, 16B, 16C and 16D located around the end face 15*a* of the main pole 15 protrude when the first and second return path sections 40 and 30 and the shields 16A, 16B, 16C and 16D are heated. This makes the aforementioned problem more noticeable.

In contrast, in the present embodiment, at least part of the heater 82 is received in the receiving space 150 defined between the expansion member 80 and the metal portion 84. The expansion member 80 is located farther from the medium facing surface 90 than is the main pole 15. The metal portion 84 is separated from the first return path section 40 and the second return path section 30. The heat generated by the heater 82 is transferred to the expansion member 80 and the metal portion 84. The heat transferred from the heater 82 to the metal portion 84 is further transferred to the expansion member 80. The expansion member 80 is heated in this way. The metal portion 84 is located farther from the medium facing surface 90 than is the main pole 15 as with the expansion member 80, and is separated from the first return path section 40 and the second return path section 30. Thus, the heat generated by the heater 82 is less likely to be transferred to components of the magnetic head other than the expansion member 80 and the metal portion 84, particularly to the first return path section 40 and the second return path section 30.

Consequently, the present embodiment allows the expansion member 80 to be efficiently heated by the heater 82 while allowing components of the magnetic head other than the expansion member 80 and the metal portion 84 to be prevented from being heated by the heater 82. The present embodiment thus makes it possible to increase the amount of protrusion of the end face 15*a* of the main pole 15 while suppressing protrusion of portions located around the end face 15*a* of the main pole 15 in the medium facing surface 90.

Further, in the present embodiment, the expansion member 80 has a linear expansion coefficient higher than that of the main pole 15. The present embodiment thus allows for more efficient protrusion of the end face 15*a* of the main pole 15 when compared with the magnetic head of the comparative example configured to heat the main pole 15.

Further, as shown in FIG. 8, the present embodiment allows the end face 15a of the main pole 15 to protrude by the greatest amount when compared with the other parts of the end face of the write head unit 9 located in the medium facing surface 90. The present embodiment thus makes it possible to recognize and control the distance from the end face 15a of the main pole 15 to the surface of the recording medium 100.

Now, a description will be given of an example of how to recognize and control the distance from the end face 15a of the main pole 15 to the surface of the recording medium 100. The amount of protrusion of the end face 15a of the main pole 15 has a correlation with the magnitude of supply power to the heater 82. Before shipment of a magnetic disk drive as a final product, the following test is performed. In the test, with the slider floated above the surface of a rotating recording medium 100, the magnitude of the power being supplied to the heater 82 is gradually increased to gradually increase the amount of protrusion of the end face 15a of the main pole 15. Upon contact of the end face 15a of the main pole 15 with the surface of the recording medium 100, the contact is detected by the contact sensor 78. This test determines the magnitude of supply power to the heater 82 at which the end face 15a of the main pole 15 comes into contact with the surface of the recording medium 100. Such magnitude of supply power will be referred to as "power at contact". At the time of shipment of a magnetic disk drive as a final product, the magnitude of supply power to the heater 82 is set to a predetermined value smaller than the power at contact. In this case, the distance from the end face 15a of the main pole 15 to the surface of the recording medium 100 can be recognized and controlled by the magnitude of supply power to the heater 82.

If the amount of protrusion of any part of the end face of the write head unit 9 other than the end face 15a of the main pole 15 is the greatest unlike the present embodiment, in the aforementioned test the contact sensor 78 detects a contact of the part other than the end face 15a of the main pole 15 with the surface of the recording medium 100. At this time, the distance from the end face 15a of the main pole 15 to the surface of the recording medium 100 is unknown. Thus, in this case, it is not possible to recognize and control the distance from the end face 15a of the main pole 15 to the surface of the recording medium 100.

It should be noted that in the present embodiment, the heater 72 can heat a plurality of components of the magnetic head located near the heater 72, and can thereby allow the end face of the read head unit 8 to protrude toward the recording medium 100 so as to reduce the distance from the read head unit 8 to the surface of the recording medium 100. This makes it possible to provide an increased recording density while preventing the reading capability of the read head unit 8 from being reduced with increases in recording density.

The other effects provided by the present embodiment will now be described. If the first end face of the first coil surrounding portion constituted of the first shield 16A, the first yoke layer 41 and the magnetic layer 43 is exposed over a large area in the medium facing surface 90, a portion of the magnetic flux captured into the first coil surrounding portion through a portion of the first end face located near the end face 15a of the main pole 15 may leak toward the recording medium 100 through another portion of the first end face. This may result in the occurrence of unwanted erasure. On the other hand, if the first coil surrounding portion is reduced in dimension in the track width direction TW, the first coil surrounding portion decreases in volume and thus becomes prone to flux saturation. This may result in leakage of magnetic flux from the first end face toward the recording medium 100, and may thereby induce unwanted erasure.

In the present embodiment, the first coil surrounding portion is shaped to form the first coil receiving space, that is, shaped to surround a part of the first portion 20. This allows the first coil surrounding portion to be large in volume. On the other hand, the width in the track width direction TW of the first end face constituted of the end face 16Aa of the first shield 16A and the end face of the magnetic layer 43 is smaller than the maximum width in the track width direction TW of the first coil receiving space. This allows the first end face to be small in area. The present embodiment thus makes it possible that the first coil surrounding portion is large in volume while the first end face is small in area.

Likewise, the second coil surrounding portion constituted of the second shield 16B, the second yoke layer 31 and the magnetic layers 33 and 34 is shaped to form the second coil receiving space, that is, shaped to surround a part of the second portion 10. This allows the second coil surrounding portion to be large in volume. On the other hand, the width in the track width direction TW of the second end face of the second coil surrounding portion constituted of the end face 16Ba of the second shield 16B and the respective end faces of the magnetic layers 33 and 34 is smaller than the maximum width in the track width direction TW of the second coil receiving space. This allows the second end face to be small in area. The present embodiment thus makes it possible that the second coil surrounding portion is large in volume while the second end face is small in area.

As discussed above, the present embodiment allows the first and second coil surrounding portions to be large in volume while allowing the first and second end faces exposed in the medium facing surface 90 to be small in area. Consequently, the present embodiment makes it possible to prevent leakage of magnetic flux from the first and second end faces that would occur in the case where the first and second end faces are exposed over a large area in the medium facing surface 90 or where the first and second coil surrounding portions are small in volume. The present embodiment thus allows for preventing unwanted erasure from occurring due to leakage of magnetic flux toward the recording medium 100 from the first and second end faces exposed in the medium facing surface 90.

Further, in the present embodiment, the top surface 15T of the main pole 15 includes the first inclined portion 15T1, and the bottom end 15L of the main pole 15 includes the second inclined portion. This allows the main pole 15 to have a small thickness in the medium facing surface 90, thereby allowing for the prevention of unwanted erasure induced by a skew. On the other hand, since a portion of the main pole 15 away from the medium facing surface 90 can have a large thickness, the main pole 15 is able to guide much magnetic flux to the medium facing surface 90. This allows for improvement of write characteristics such as the overwrite property.

In the present embodiment, the first inclined portion 15T1 is smaller than the inclined surface 16Ab of the first shield 16A in length in the direction perpendicular to the medium facing surface 90. This allows the first inclined portion 15T1 and the inclined surface 16Ab to be opposed to each other over a smaller area, thereby allowing for the prevention of flux leakage from the main pole 15 to the first shield 16A.

By virtue of the features of the shape of the main pole 15 and the features associated with the relation between the main pole 15 and the first shield 16A described above, the present embodiment makes it possible to prevent the occurrence of problems induced by a skew and allows for improvement of write characteristics.

In the present embodiment, the coil elements 21A and 22A are arranged to pass between the first shield 16A and the first yoke layer 41. This allows for placement of the coil elements 21A and 22A in the first space S1 with high space utilization efficiency, and consequently allows for a reduction in length of a magnetic path that passes through the first shield 16A, the first return path section 40 and the main pole 15. The present embodiment thus makes it possible to improve the rate of change in the direction of magnetic flux produced from the end face 15a of the main pole 15.

In the present embodiment, in particular, the coil element 21A includes the portion 21A1 located between the first flat portion 15T2 of the top surface 15T and the second portion 16Ab2 of the inclined surface 16Ab. More specifically, in the present embodiment, the portion 21A1 of the coil element 21A is disposed in a space that is produced between the first flat portion 15T2 and the second portion 16Ab2 by the features associated with the relation between the main pole 15 and the first shield 16A described above. The present embodiment thus allows for placement of the coil elements in the first space S1 with higher space utilization efficiency, and consequently allows for a further reduction in length of the magnetic path passing through the first shield 16A, the first return path section 40 and the main pole 15.

In the present embodiment, the coil elements 10A and 10B are arranged in the vicinity of the main pole 15 to pass between the magnetic layer 34 and the second yoke layer 31. This allows for placement of the coil elements 10A and 10B in the second space S2 with high space utilization efficiency, and consequently allows for a reduction in length of a magnetic path that passes through the second shield 16B, the second return path section 30 and the main pole 15. The present embodiment thus makes it possible to improve the rate of change in the direction of magnetic flux produced from the end face 15a of the main pole 15.

Second Embodiment

Figure 9:
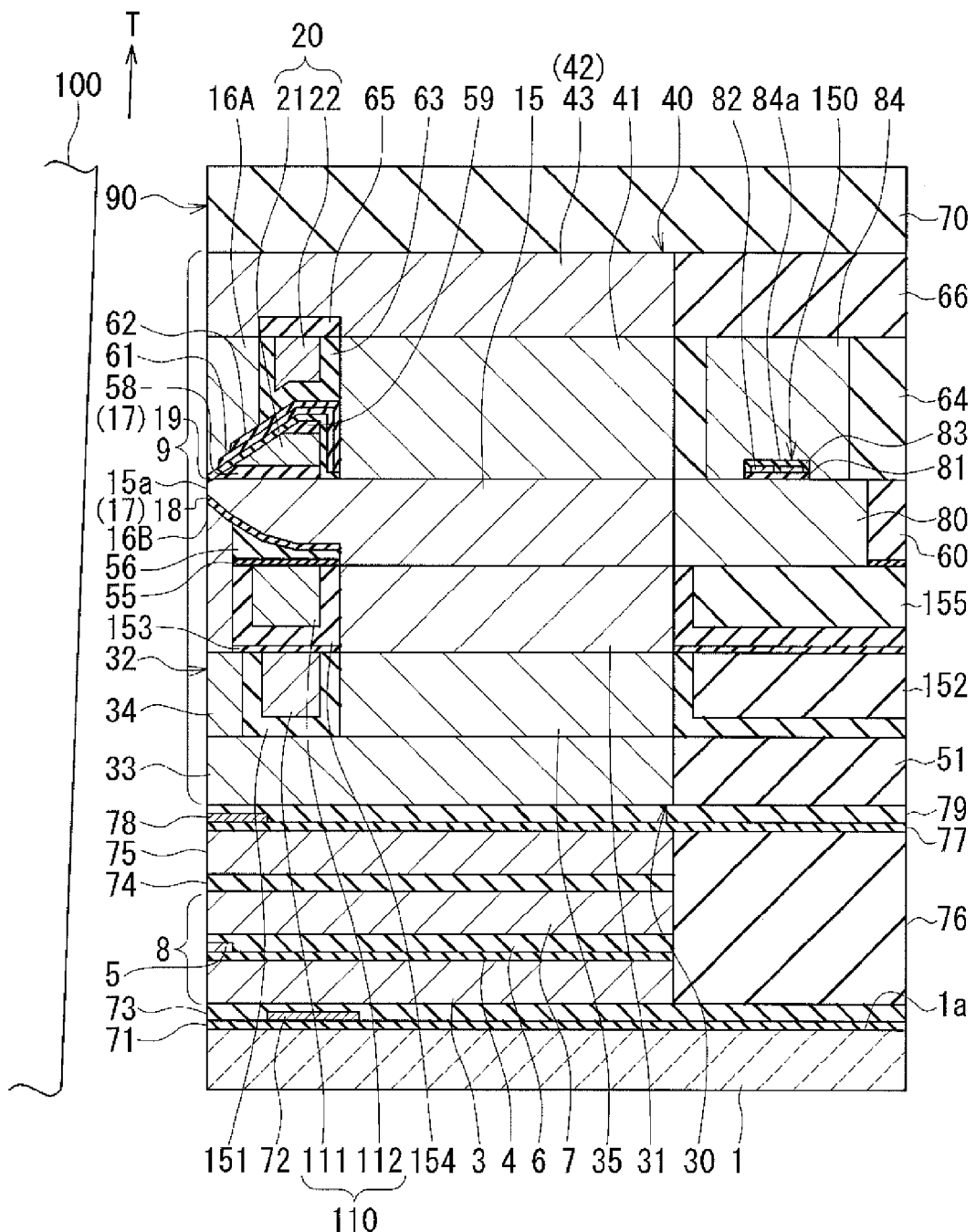
FIG. 9 is a cross-sectional view showing a magnetic head according to a second embodiment of the invention.
Figure 10:
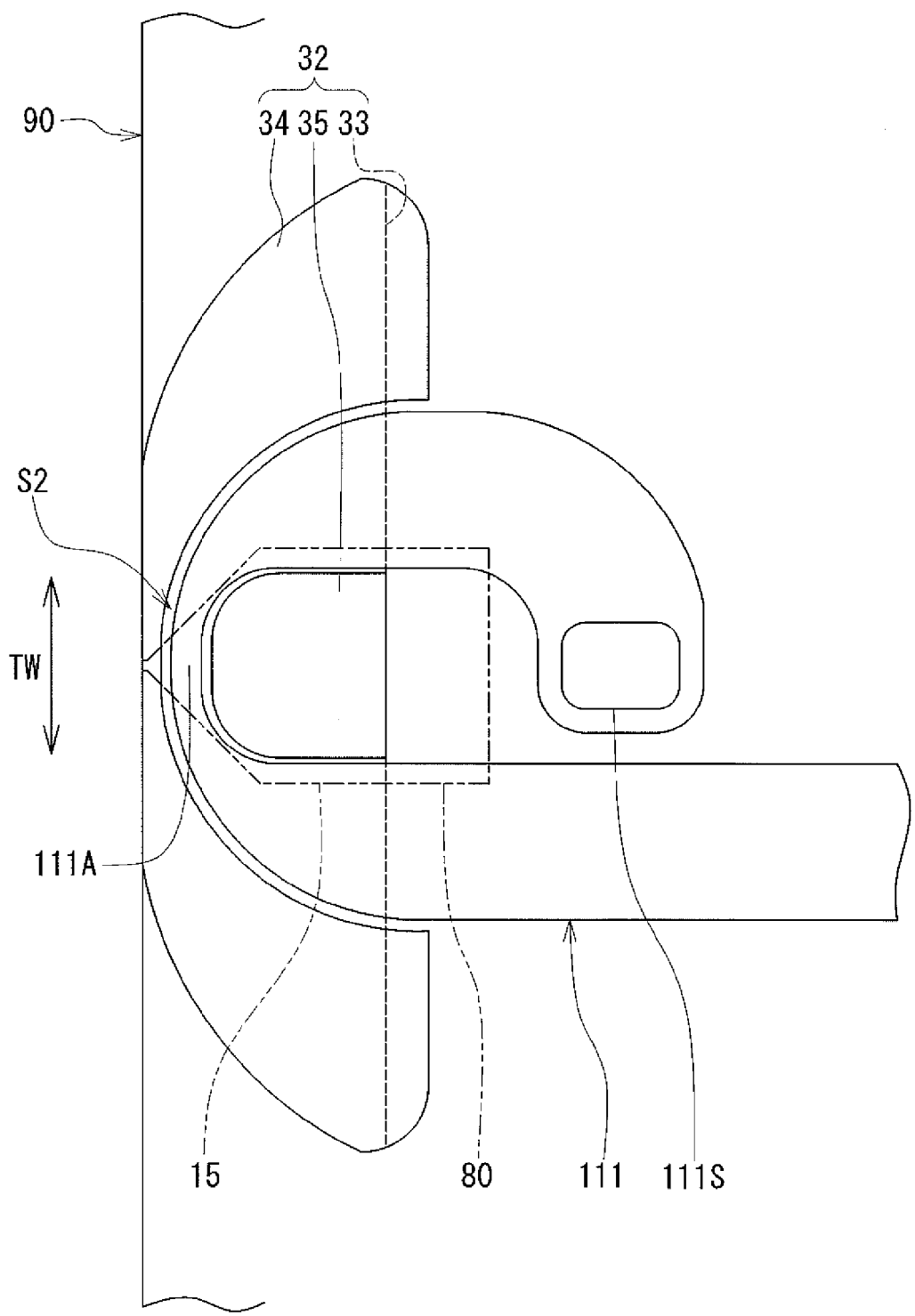
FIG. 10 is a plan view showing a first layer of a second portion of a coil of the magnetic head according to the second embodiment of the invention.
Figure 11:
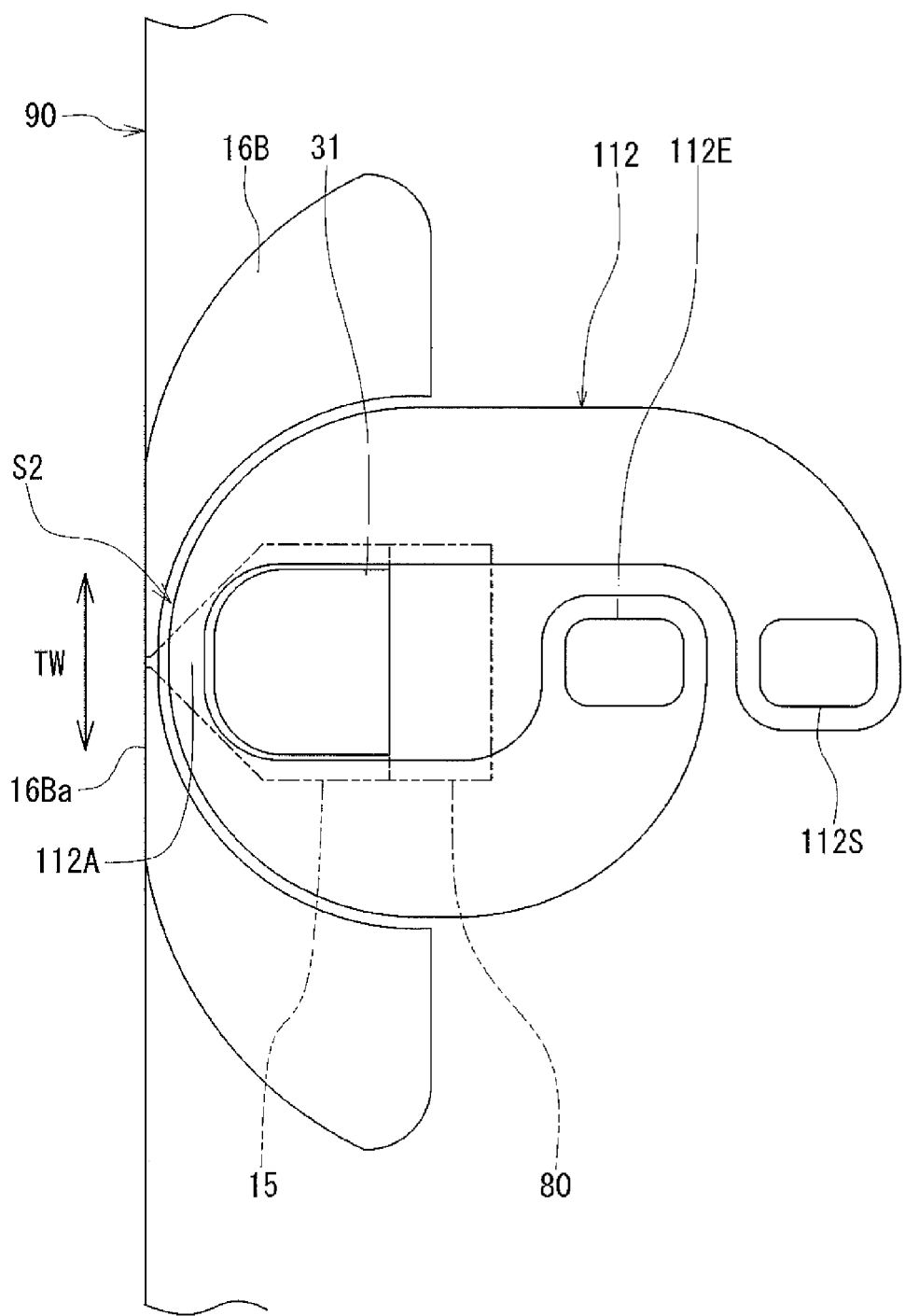
FIG. 11 is a plan view showing a second layer of the second portion of the coil of the magnetic head according to the second embodiment of the invention.

A magnetic head according to a second embodiment of the invention will now be described with reference to FIG. 9 to FIG. 11. FIG. 9 is a cross-sectional view of the magnetic head according to the present embodiment. Note that FIG. 9 shows the main cross section. FIG. 10 is a plan view showing a first layer of a second portion of the coil of the present embodiment. FIG. 11 is a plan view showing a second layer of the second portion of the coil of the present embodiment.

The configuration of the magnetic head according to the present embodiment differs from that of the magnetic head according to the first embodiment in the following ways. The second connecting portion 32 of the second return path section 30 of the present embodiment includes a magnetic layer 35 in addition to the magnetic layers 33 and 34. The magnetic layer 35 is located farther from the medium facing surface 90 than is the magnetic layer 34 and lies on the magnetic layer 33. In the present embodiment, the second yoke layer 31 lies on the magnetic layer 35.

The coil of the present embodiment includes a second portion 110 in place of the second portion 10 of the first embodiment. The second portion 110 includes a first layer 111 and a second layer 112. As shown in FIG. 10, the first layer 111 is wound approximately one turn around the magnetic layer 35. As shown in FIG. 11, the second layer 112 is wound one turn around the second yoke layer 31.

The magnetic head according to the present embodiment includes insulating films 151 and 154 and insulating layers 152, 153 and 155, each of which is formed of an insulating material, in place of the insulating film 52 and the insulating layers 53 and 54. The insulating films 151 and 154 and the insulating layers 152, 153 and 155 are formed of alumina, for example. The insulating film 151 isolates the first layer 111 from the magnetic layers 33 to 35. The insulating layer 152 is disposed around the first layer 111 and the magnetic layers 34 and 35. The insulating layer 153 lies on the top surfaces of the first layer 111, the insulating film 151 and the insulating layer 152 and part of the top surface of the magnetic layer 34. The insulating film 154 isolates the second layer 112 from the second shield 16B, the second yoke layer 31 and the insulating layer 153. The insulating layer 155 is disposed around the second layer 112, the second shield 16B and the second yoke layer 31. In the present embodiment, the insulating layer 55 lies on the top surfaces of the second layer 112, the insulating film 154 and the insulating layer 155.

The second portion 110 of the coil will now be described in detail with reference to FIG. 10 and FIG. 11. As shown in FIG. 10, the first layer 111 of the second portion 110 is wound approximately one turn around the magnetic layer 35. The first layer 111 includes a coil element 111A extending to pass between the magnetic layer 34 and the magnetic layer 35, in particular, within the second space S2. The first layer 111 has a coil connection 111S electrically connected to the second layer 112.

As shown in FIG. 11, the second layer 112 of the second portion 110 is wound one turn around the second yoke layer 31. The second layer 112 includes a coil element 112A extending to pass between the second shield 16B and the second yoke layer 31, in particular, within the second space S2. The second layer 112 has a coil connection 112S electrically connected to the coil connection 22E (see FIG. 6) of the second layer 22 of the first portion 20, and a coil connection 112E penetrating the insulating layer 153 and the insulating film 154 and electrically connected to the coil connection 111S of the first layer 111. In the present embodiment, the connecting layer 86 described in the first embodiment section and shown in FIG. 4 and FIG. 5 is located on the coil connection 112S. The coil connection 112S is electrically connected to the coil connection 22E via the connecting layer 86. The lead layer 85 shown in FIG. 4 and FIG. 5 is not provided in the present embodiment.

The coil elements 111A and 112A correspond to the at least one second coil element of the present invention. Since the second layer 112 is part of the coil, the coil can be said to include the second coil elements 111A and 112A.

The remainder of configuration, function and effects of the present embodiment are similar to those of the first embodiment.

Third Embodiment

Figure 12:
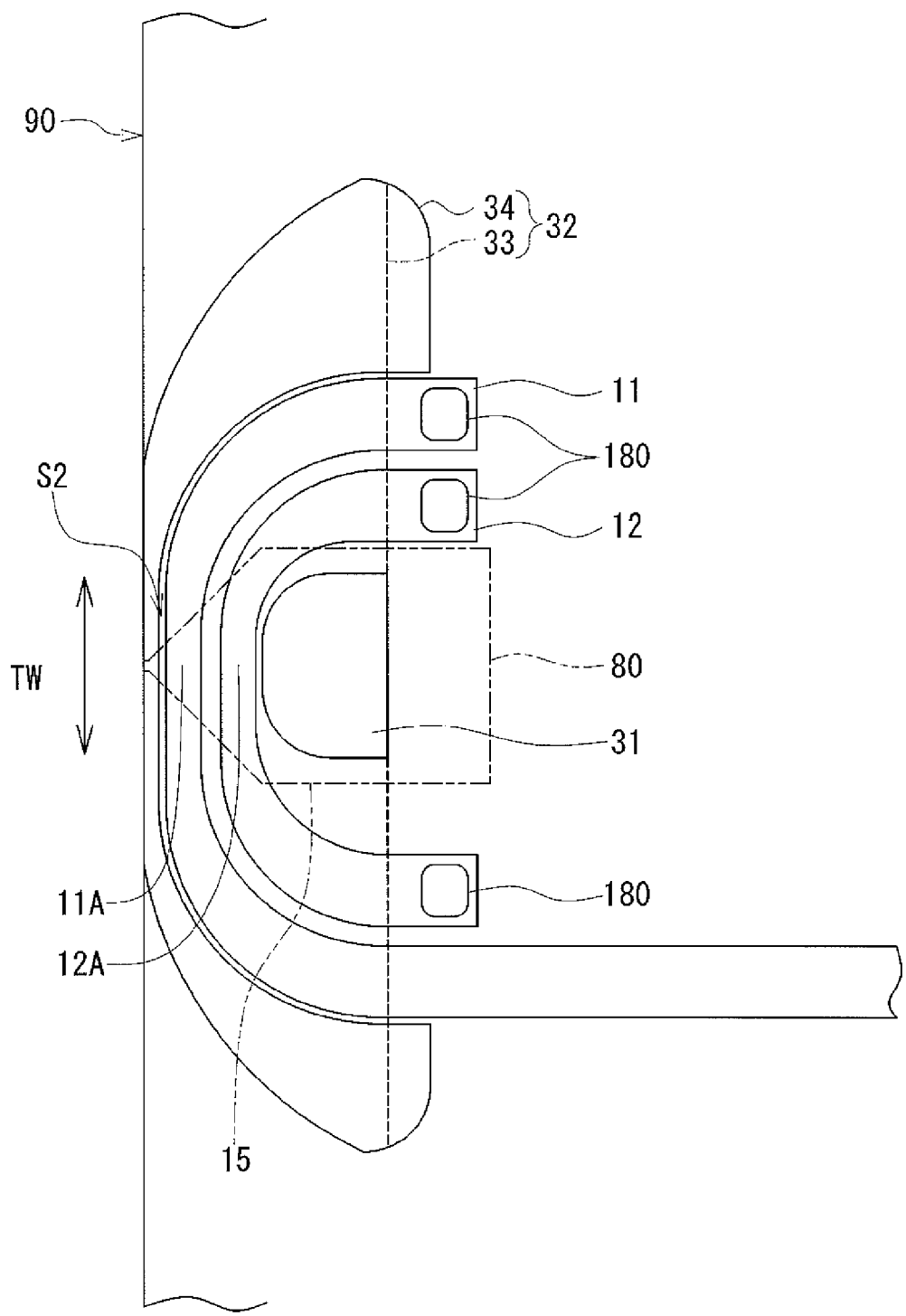
FIG. 12 is a plan view showing a second portion of a coil of a magnetic head according to a third embodiment of the invention.
Figure 13:
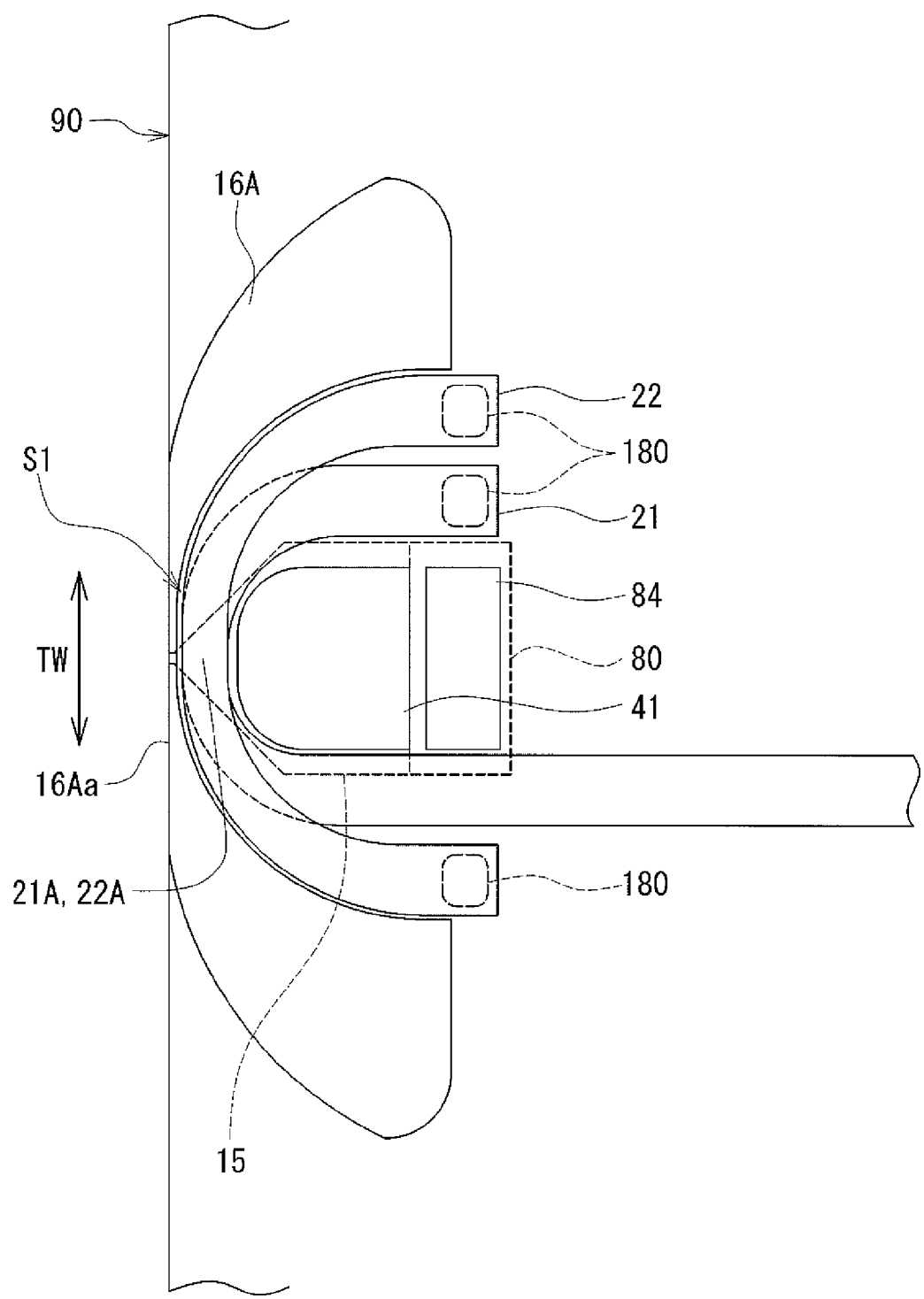
FIG. 13 is a plan view showing a first portion of the coil of the magnetic head according to the third embodiment of the invention.

A magnetic head according to a third embodiment of the invention will now be described with reference to FIG. 12 and FIG. 13. FIG. 12 is a plan view showing a second portion of the coil of the magnetic head according to the present embodiment. FIG. 13 is a plan view showing a first portion of the coil of the magnetic head according to the present embodiment.

The magnetic head according to the present embodiment differs from the magnetic head according to the first embodiment in the following ways. In the magnetic head according to the present embodiment, the coil is wound approximately two turns around the main pole 15. The coil of the present embodiment includes a second portion including two line-shaped portions 11 and 12 shown in FIG. 12, in place of the second portion 10 of the first embodiment shown in FIG. 3. The coil of the present embodiment further includes a first portion including a first layer 21 and a second layer 22 shaped as shown in FIG. 13, in place of the first portion 20 including the first layer 21 and the second layer 22 of the first embodiment shown in FIG. 5 and FIG. 6.

As shown in FIG. 12, the line-shaped portions 11 and 12 include coil elements 11A and 12A, respectively, each extending to pass through the second space S2. The coil elements 11A and 12A are arranged in this order in the direction perpendicular to the medium facing surface 90, the coil element 11A being closer to the medium facing surface 90.

The coil elements 11A and 12A correspond to the at least one second coil element of the present invention. Since the line-shaped portions 11 and 12 are part of the coil, the coil can be said to include the second coil elements 11A and 12A.

As shown in FIG. 13, the first layer 21 and the second layer 22 of the present embodiment include first coil elements 21A and 22A, respectively, each extending to pass between the first shield 16A and the first yoke layer 41, in particular, within the first space S1.

The line-shaped portions 11 and 12 are electrically connected to the first and second layers 21 and 22 via three connecting layers 180 of columnar shape, which penetrate a plurality of layers interposed therebetween, so as to form a coil that is wound helically around the main pole 15. The connecting layers 180 are each formed of a conductive material such as copper.

The remainder of configuration, function and effects of the present embodiment are similar to those of the first embodiment.

Fourth Embodiment

Figure 14:
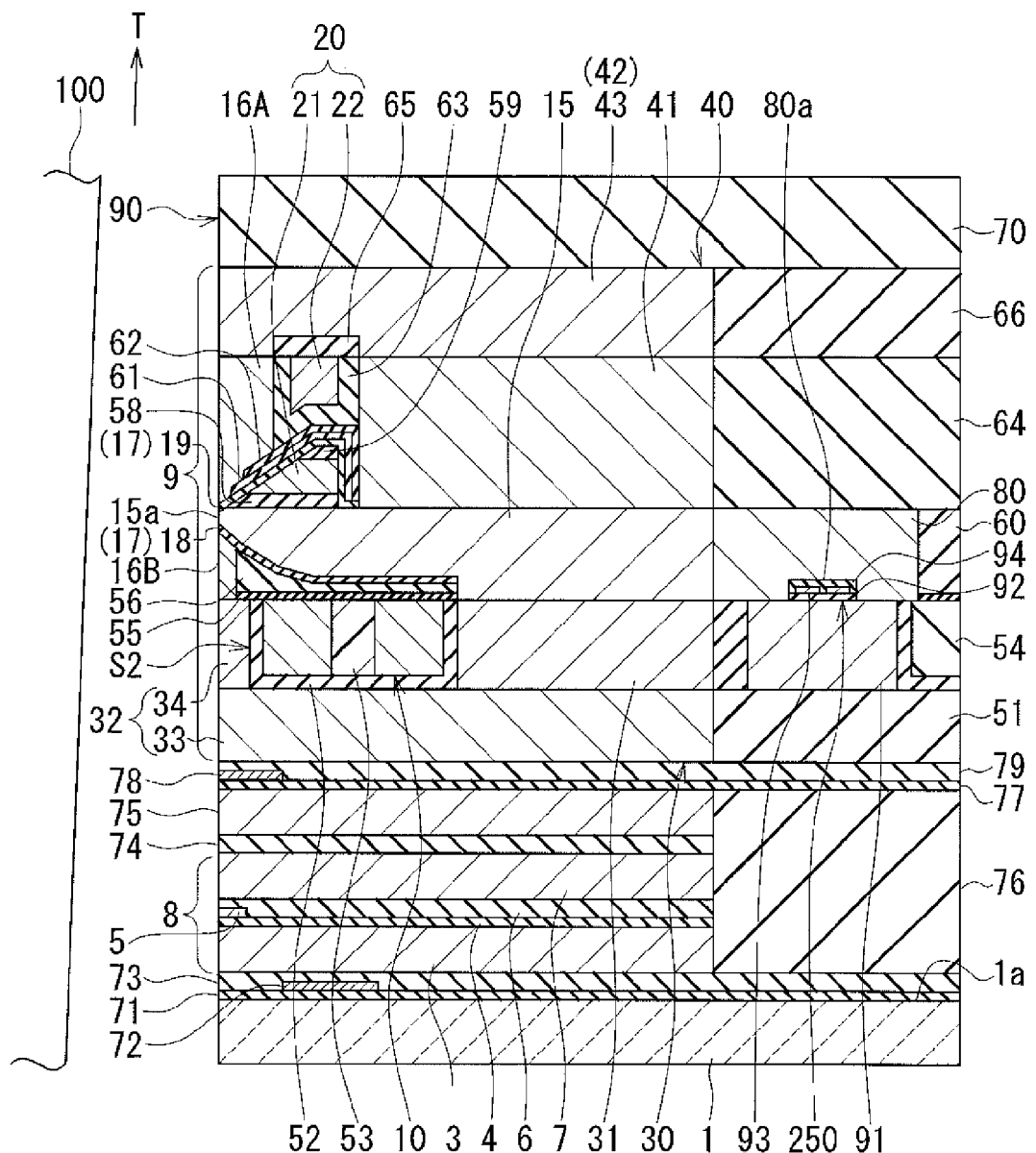
FIG. 14 is a cross-sectional view showing a magnetic head according to a fourth embodiment of the invention.
Figure 15:
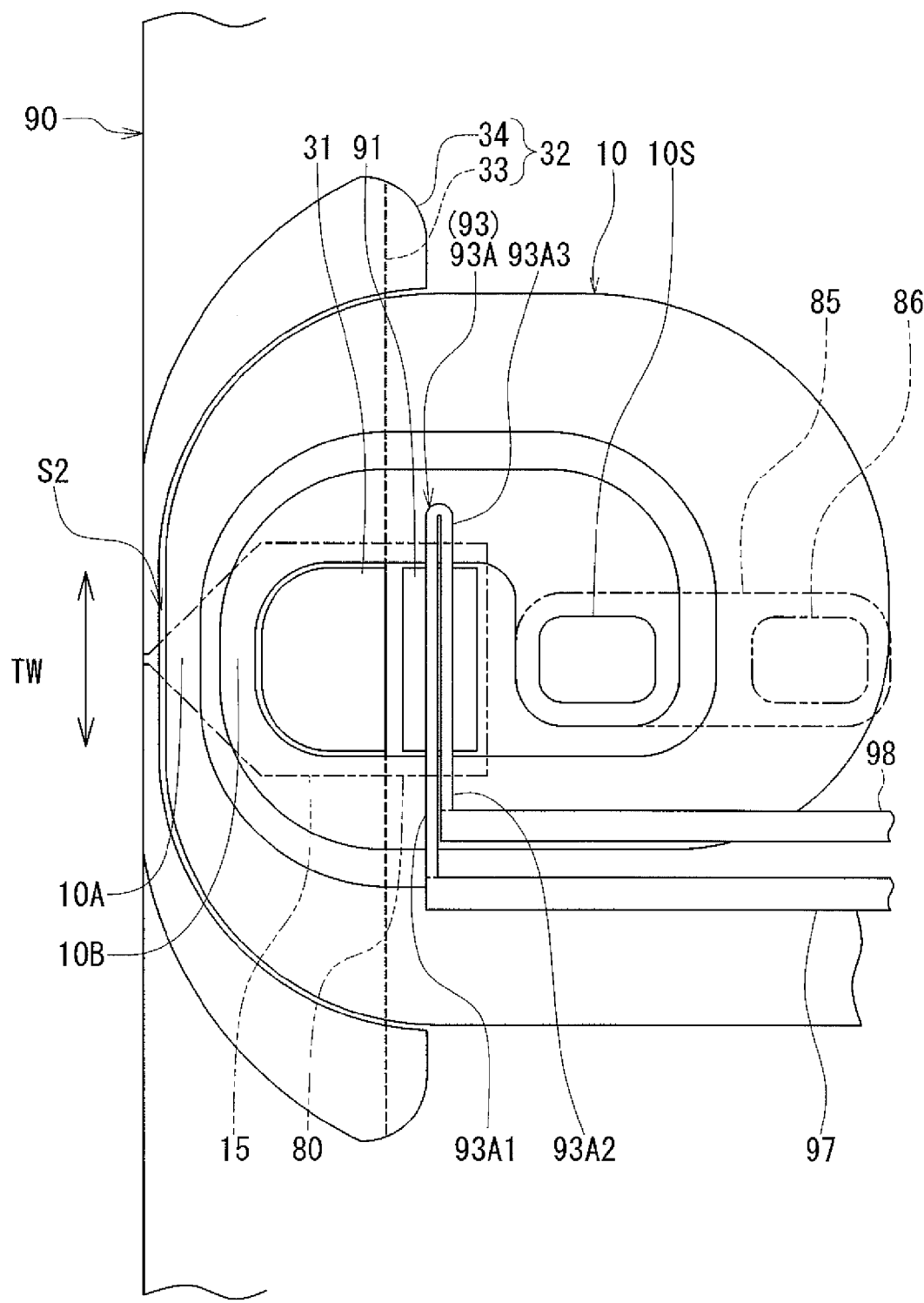
FIG. 15 is a plan view showing a second portion of a coil, a heater and a metal portion of the magnetic head according to the fourth embodiment of the invention.

A magnetic head according to a fourth embodiment of the invention will now be described with reference to FIG. 14 and FIG. 15. FIG. 14 is a cross-sectional view of the magnetic head according to the present embodiment. Note that FIG. 14 shows the main cross section. FIG. 15 is a plan view showing a second portion of the coil, the heater and the metal portion of the present embodiment.

The configuration of the magnetic head according to the present embodiment differs from that of the magnetic head according to the first embodiment in the following ways. The magnetic head according to the present embodiment includes a heater 93 and a metal portion 91 in place of the heater 82 and the metal portion 84 of the first embodiment. The heater 93 and the metal portion 91 are located on the rear side in the direction T of travel of the recording medium 100 relative to the expansion member 80. The heater 93 is to heat the expansion member 80, and is located away from the medium facing surface 90. The metal portion 91 is formed of a metal material and adjacent to the expansion member 80 such that the heater 93 is interposed between the metal portion 91 and the expansion member 80.

The metal portion 91 is located farther from the medium facing surface 90 than is the second yoke layer 31 and lies on the insulating layer 51. In the present embodiment, as shown in FIG. 15, the second portion 10 of the coil is wound approximately two turns around the second yoke layer 31 and the metal portion 91. The insulating film 52 and the insulating layer 54 are disposed around the metal portion 91.

The expansion member 80 and the metal portion 91 define therebetween a receiving space 250 for receiving at least part of the heater 93. The expansion member 80 of the present embodiment has a recess 80a that opens in the bottom surface of the expansion member 80. The recess 80a extends in the track width direction TW. The receiving space 250 is a space located between the recess 80a and the top surface of the metal portion 91.

At least part of the heater 93 is received in the receiving space 250. The heater 93 includes a line-shaped conductor 93A that generates heat when energized. As shown in FIG. 15, the line-shaped conductor 93A is of the same shape as the line-shaped conductor 82A of the first embodiment shown in FIG. 4. More specifically, the line-shaped conductor 93A includes two linear portions 93A1 and 93A2 extending linearly in the track width direction TW, and a connecting portion 93A3 connecting one end of the linear portion 93A1 to one end of the linear portion 93A2. The connecting portion 93A3 is U-shaped, for example. The linear portion 93A2 is located farther from the medium facing surface 90 than is the linear portion 93A1. A part of each of the linear portions 93A1 and 93A2 is located in the receiving space 250. One end and the other end of the linear portion 93A1, one end and the other end of the linear portion 93A2, and the connecting portion 93A3 are located outside the receiving space 250.

Further, the magnetic head according to the present embodiment includes a pair of leads 97 and 98 in place of the pair of leads 87 and 88 of the first embodiment. The pair of leads 97 and 98 are connected to the other end of the linear portion 93A1 and the other end of the linear portion 93A2, respectively. The line-shaped conductor 93A is configured to be energized through the pair of leads 97 and 98 to thereby generate heat. In FIG. 15, the boundary between the linear portion 93A1 and the lead 97 and the boundary between the linear portion 93A2 and the lead 98 are shown by broken lines. The line-shaped conductor 93A is formed of the same material as the line-shaped conductor 82A of the first embodiment. The function of the heater 93 is the same as that of the heater 82 described in the first embodiment section.

The metal portion 91 may be formed of the same material as the metal portion 84 of the first embodiment. More specifically, the metal material used to form the metal portion 91 may be a magnetic metal material or a nonmagnetic metal material.

The metal portion 91 is separated from the second return path section 30. In the case of employing a magnetic metal material as the metal material to form the metal portion 91, the metal portion 91, the second yoke layer 31 and the magnetic layer 34 may be formed of one and the same magnetic metal material. In such a case, it is possible to form the metal portion 91, the second yoke layer 31 and the magnetic layer 34 simultaneously. The second yoke layer 31, the magnetic layer 34 and the metal portion 91 are disposed such that an imaginary plane passing through the second yoke layer 31, the magnetic layer 34 and the metal portion 91 can lie parallel to the top surface 1a of the substrate 1.

The magnetic head according to the present embodiment further includes an insulating layer 92 formed of an insulating material and lying on the metal portion 91. The heater 93 lies on the insulating layer 92. The magnetic head further includes an insulating layer 94 formed of an insulating material and covering the insulating layer 92 and the heater 93. The insulating layer 94 is interposed between the heater 93 and the expansion member 80. In the example shown in FIG. 15, the top surface of the metal portion 91 around the heater 93 is in contact with the bottom surface of the expansion member 80. The metal portion 91 may be in non-contact with the expansion member 80. In such a case, the insulating layers 92 and 94 are interposed between the expansion member 80 and the metal portion 91. The insulating layers 92 and 94 are formed of alumina, for example. The insulating layers 81 and 83 are not provided in the present embodiment.

The magnetic head further includes an insulating portion formed of an insulating material and insulating the line-shaped conductor 93A from the expansion member 80 and the metal portion 91. The insulating portion is constituted of a portion of the insulating layer 92 that is located between the line-shaped conductor 93A and the metal portion 91 and a portion of the insulating layer 94 that is located between the line-shaped conductor 93A and the expansion member 80.

The coil of the present embodiment may include the second portion 110 of the second embodiment in place of the second portion 10. Alternatively, the coil of the present embodiment may be the coil described in the third embodiment section. The remainder of configuration, function and effects of the present embodiment are similar to those of any of the first to third embodiments.

Fifth Embodiment

Figure 16:
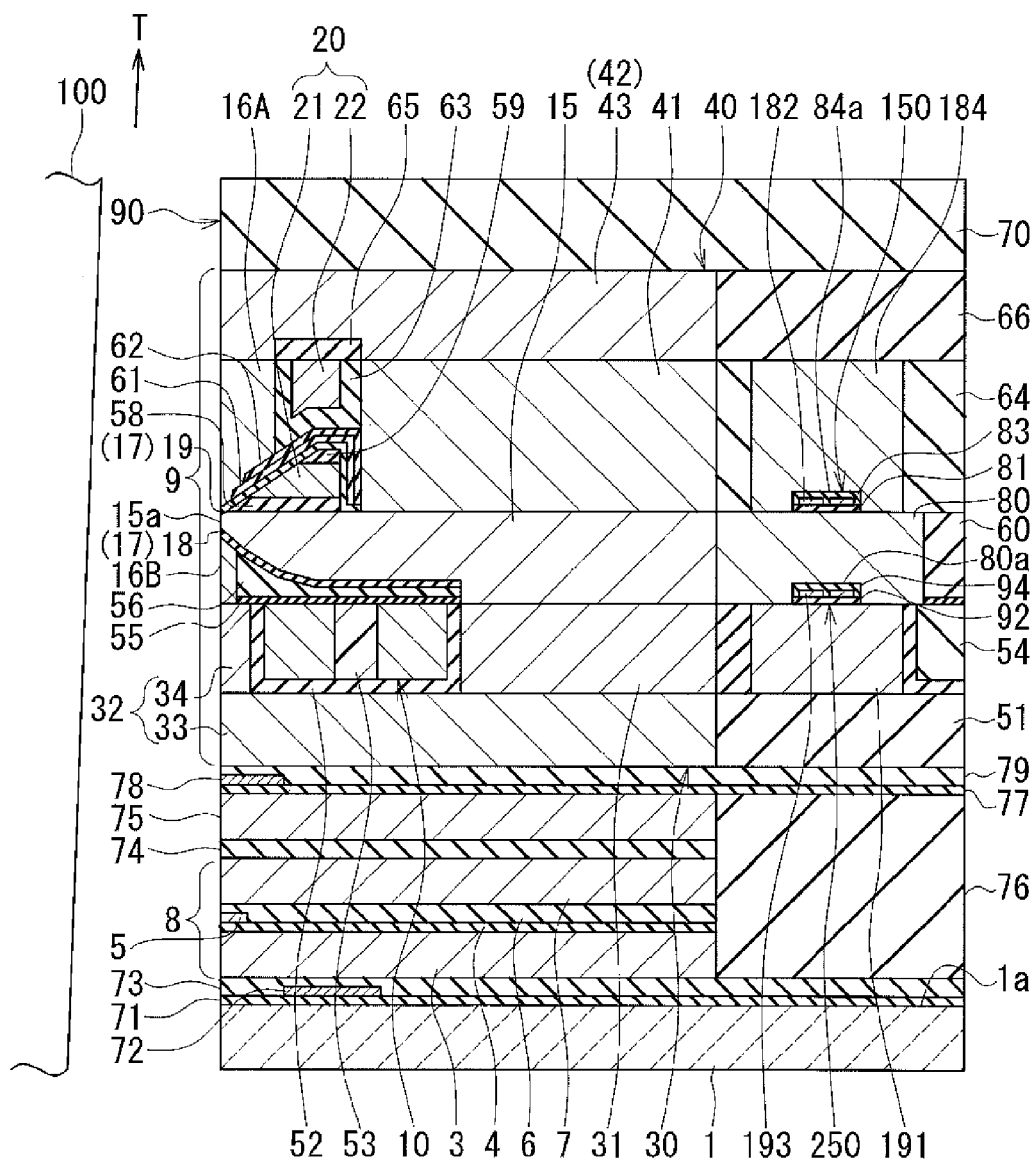
FIG. 16 is a cross-sectional view showing a magnetic head according to a fifth embodiment of the invention.

A magnetic head according to a fifth embodiment of the invention will now be described with reference to FIG. 16. FIG. 16 is a cross-sectional view of the magnetic head according to the present embodiment. Note that FIG. 16 shows the main cross section. The magnetic head according to the present embodiment is provided with a heater including a first heater portion 182 located on the front side in the direction T of travel of the recording medium 100 relative to the expansion member 80 and a second heater portion 193 located on the rear side in the direction T of travel of the recording medium 100 relative to the expansion member 80. The magnetic head is further provided with a metal portion including a first metal layer 184 disposed such that the first heater portion 182 is interposed between the expansion member 80 and the first metal layer 184, and a second metal layer 191 disposed such that the second heater portion 193 is interposed between the expansion member 80 and the second metal layer 191.

The shapes and locations of the first heater portion 182 and the first metal layer 184 are the same as those of the heater 82 and the metal portion 84 of the first embodiment. As with the first embodiment, the expansion member 80 and the first metal layer 184 define therebetween a receiving space 150 for receiving at least part of the first heater portion 182. The at least part of the first heater portion 182 is received in the receiving space 150. The first heater portion 182 includes the line-shaped conductor 82A described in the first embodiment section. Part of the line-shaped conductor 82A (part of each of the linear portions 82A1 and 82A2) is located in the receiving space 150. Further, the magnetic head includes a pair of leads 87 and 88 (see FIG. 4) connected to the other end of the linear portion 82A1 and the other end of the linear portion 82A2, respectively, and the insulating layers 81 and 83 described in the first embodiment section.

The first metal layer 184 is located farther from the medium facing surface 90 than is the first yoke layer 41 and separated from the first return path section 40. In the case of employing a magnetic metal material as the metal material to form the first metal layer 184, the first metal layer 184 and the first yoke layer 41 may be formed of one and the same first magnetic metal material.

The shapes and locations of the second heater portion 193 and the second metal layer 191 are the same as those of the heater 93 and the metal portion 91 of the fourth embodiment. As with the fourth embodiment, the expansion member 80 and the second metal layer 191 define therebetween a receiving space 250 for receiving at least part of the second heater portion 193. The at least part of the second heater portion 193 is received in the receiving space 250. The second heater portion 193 includes the line-shaped conductor 93A described in the fourth embodiment section. Part of the line-shaped conductor 93A (part of each of the linear portions 93A1 and 93A2) is located in the receiving space 250. Further, the magnetic head includes a pair of leads 97 and 98 (see FIG. 15) connected to the other end of the linear portion 93A1 and the other end of the linear portion 93A2, respectively, and the insulating layers 92 and 94 described in the fourth embodiment section.

The second metal layer 191 is located farther from the medium facing surface 90 than is the second yoke layer 31 and separated from the second return path section 30. In the case of employing a magnetic metal material as the metal material to form the second metal layer 191, the second metal layer 191, the second yoke layer 31 and the magnetic layer 34 may be formed of one and the same second magnetic metal material.

The present embodiment allows the expansion member 80 to be heated more efficiently by the first and second heater portions 182 and 193 of the heater which are located on the front side and the rear side, respectively, in the direction T of travel of the recording medium 100 relative to the expansion member 80. Further, in the present embodiment, the heat generated by the first heater portion 182 is transferred to the expansion member 80 and the first metal layer 184 of the metal portion, and the heat generated by the second heater portion 193 is transferred to the expansion member 80 and the second metal layer 191 of the metal portion. The heat transferred from the first heater portion 182 to the first metal layer 184 and the heat transferred from the second heater portion 193 to the second metal layer 191 are further transferred to the expansion member 80. In the present embodiment, this also serves to heat the expansion member 80 more efficiently.

The remainder of configuration, function and effects of the present embodiment are similar to those of the first or fourth embodiment.

The present invention is not limited to the foregoing embodiments, and various modifications may be made thereto. For example, the heater of the present invention is not limited to the one described in each of the foregoing embodiments, and may be any other heater capable of generating heat.

Further, in the present invention, the heater 72 and the contact sensor 78 are not essential components, and can be dispensed with.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:
   a medium facing surface facing a recording medium;
   a coil producing a magnetic field that corresponds to data to be written on the recording medium;
   a main pole having an end face located in the medium facing surface, the main pole allowing a magnetic flux that corresponds to the magnetic field produced by the coil to pass, and producing a write magnetic field for writing the data on the recording medium by means of a perpendicular magnetic recording system;
   an expansion member that is located farther from the medium facing surface than is the main pole, and is adjacent to the main pole in a direction perpendicular to the medium facing surface;
   a heater for heating the expansion member; and
   a metal portion formed of a metal material and adjacent to the expansion member, wherein the expansion member has a linear expansion coefficient higher than that of the main pole, the expansion member and the metal portion define therebetween a receiving space for receiving at least part of the heater, and the at least part of the heater is received in the receiving space.

2. A magnetic head for perpendicular magnetic recording, comprising:

a medium facing surface facing a recording medium;

a coil producing a magnetic field that corresponds to data to be written on the recording medium;

a main pole having an end face located in the medium facing surface, the main pole allowing a magnetic flux that corresponds to the magnetic field produced by the coil to pass, and producing a write magnetic field for writing the data on the recording medium by means of a perpendicular magnetic recording system;

an expansion member that is located farther from the medium facing surface than is the main pole, and is adjacent to the main pole; and a heater for heating the expansion member, wherein the main pole and the expansion member are located on a same axis perpendicular to the medium facing surface, and the expansion member has a linear expansion coefficient higher than that of the main pole.

3. The magnetic head for perpendicular magnetic recording according to claim 2, further comprising:

a metal portion formed of a metal material and adjacent to the expansion member, wherein the expansion member and the metal portion define therebetween a receiving space for receiving at least part of the heater, and the at least part of the heater is received in the receiving space.

4. The magnetic head for perpendicular magnetic recording according to claim 2, wherein the expansion member is formed of a nonmagnetic metal material.

5. The magnetic head for perpendicular magnetic recording according to claim 4, wherein the main pole is formed of a magnetic metal material containing any of Ni, Fe and Co, and the nonmagnetic metal material used to form the expansion member has a linear expansion coefficient higher than that of each of Ni, Fe and Co.

6. The magnetic head for perpendicular magnetic recording according to claim 2, further comprising:

a first shield formed of a magnetic material and having an end face that is located in the medium facing surface at a position on a front side in a direction of travel of the recording medium relative to the end face of the main pole;

a second shield formed of a magnetic material and having an end face that is located in the medium facing surface at a position on a rear side in the direction of travel of the recording medium relative to the end face of the main pole;

a gap part formed of a nonmagnetic material and including a first portion located between the main pole and the first shield and a second portion located between the main pole and the second shield;

a first return path section formed of a magnetic material and located on the front side in the direction of travel of the recording medium relative to the main pole, the first return path section including:

a first yoke layer located away from the medium facing surface and in contact with the main pole; and a first connecting portion located on the front side in the direction of travel of the recording medium relative to the first shield and the first yoke layer, the first connecting portion connecting the first shield and the first yoke layer to each other so that a first space is by the main pole, the first portion of the gap part, the first shield and the first return path section; and a second return path section formed of a magnetic material and located on the rear side in the direction of travel of the recording medium relative to the main pole, the second return path section including:

a second yoke layer located away from the medium facing surface and in contact with the main pole; and a second connecting portion located on the rear side in the direction of travel of the recording medium relative to the second shield and the second yoke layer, the second connecting portion connecting the second shield and the second yoke layer to each other so that a second space is defined by the main pole, the second portion of the gap part, the second shield and the second return path section, wherein the coil includes at least one first coil element passing through the first space and at least one second coil element passing through the second space.

7. The magnetic head for perpendicular magnetic recording according to claim 6, further comprising:

a metal portion formed of a metal material and adjacent to the expansion member, wherein the expansion member and the metal portion define therebetween a receiving space for receiving at least part of the heater, and the at least part of the heater is received in the receiving space.

8. The magnetic head for perpendicular magnetic recording according to claim 7, wherein the heater and the metal portion are located on the front side in the direction of travel of the recording medium relative to the expansion member, and the metal portion and the first yoke layer are formed of one and the same magnetic metal material.

9. The magnetic head for perpendicular magnetic recording according to claim 7, wherein the heater and the metal portion are located on the rear side in the direction of travel of the recording medium relative to the expansion member, and the metal portion and the second yoke layer are formed of one and the same magnetic metal material.

10. The magnetic head for perpendicular magnetic recording according to claim 7, wherein the heater includes a first heater portion located on the front side in the direction of travel of the recording medium relative to the expansion member, and a second heater portion located on the rear side in the direction of travel of the recording medium relative to the expansion member, the metal portion includes a first metal layer located on the front side in the direction of travel of the recording medium relative to the expansion member, and a second metal layer located on the rear side in the direction of travel of the recording medium relative to the expansion member, the first metal layer and the first yoke layer are formed of one and the same first magnetic metal material, and the second metal layer and the second yoke layer are formed of one and the same second magnetic metal material.

11. A magnetic head for perpendicular magnetic recording, comprising:
- a medium facing surface facing a recording medium;
- a coil producing a magnetic field that corresponds to data to be written on the recording medium, the coil including at least one first coil element and at least one second coil element;
- a main pole having an end face located in the medium facing surface, the main pole allowing a magnetic flux that corresponds to the magnetic field produced by the coil to pass, and producing a write magnetic field for writing the data on the recording medium by means of a perpendicular magnetic recording system;
- an expansion member that is located farther from the medium facing surface than is the main pole, and is adjacent to the main pole in a direction perpendicular to the medium facing surface;
- a heater for heating the expansion member;
- a first shield formed of a magnetic material and having an end face that is located in the medium facing surface at a position on a front side in a direction of travel of the recording medium relative to the end face of the main pole;
- a second shield formed of a magnetic material and having an end face that is located in the medium facing surface at a position on a rear side in the direction of travel of the recording medium relative to the end face of the main pole;
- a gap part formed of a nonmagnetic material and including a first portion located between the main pole and the first shield and a second portion located between the main pole and the second shield;
- a first return path section formed of a magnetic material and located on the front side in the direction of travel of the recording medium relative to the main pole, the first return path section including:
  - a first yoke layer located away from the medium facing surface and in contact with the main pole; and
  - a first connecting portion located on the front side in the direction of travel of the recording medium relative to the first shield and the first yoke layer, the first connecting portion connecting the first shield and the first yoke layer to each other so that a first space is defined by the main pole, the first portion of the gap part, the first shield and the first return path section; and
- a second return path section formed of a magnetic material and located on the rear side in the direction of travel of the recording medium relative to the main pole, the second return path section including:
  - a second yoke layer located away from the medium facing surface and in contact with the main pole; and
  - a second connecting portion located on the rear side in the direction of travel of the recording medium relative to the second shield and the second yoke layer, the second connecting portion connecting the second shield and the second yoke layer to each other so that a second space is defined by the main pole, the second portion of the gap part, the second shield and the second return path section, wherein
- the expansion member has a linear expansion coefficient higher than that of the main pole, and
- the at least one first coil element passes through the first space and the at least one second coil element passes through the second space.

12. The magnetic head for perpendicular magnetic recording according to claim 11, further comprising:
- a metal portion formed of a metal material and adjacent to the expansion member, wherein
- the expansion member and the metal portion define therebetween a receiving space for receiving at least part of the heater, and
- the at least part of the heater is received in the receiving space.

13. The magnetic head for perpendicular magnetic recording according to claim 12, wherein
- the heater and the metal portion are located on the front side in the direction of travel of the recording medium relative to the expansion member, and
- the metal portion and the first yoke layer are formed of one and the same magnetic metal material.

14. The magnetic head for perpendicular magnetic recording according to claim 12, wherein
- the heater and the metal portion are located on the rear side in the direction of travel of the recording medium relative to the expansion member, and
- the metal portion and the second yoke layer are formed of one and the same magnetic metal material.

15. The magnetic head for perpendicular magnetic recording according to claim 12, wherein
- the heater includes a first heater portion located on the front side in the direction of travel of the recording medium relative to the expansion member, and a second heater portion located on the rear side in the direction of travel of the recording medium relative to the expansion member,
- the metal portion includes a first metal layer located on the front side in the direction of travel of the recording medium relative to the expansion member, and a second metal layer located on the rear side in the direction of travel of the recording medium relative to the expansion member,
- the first metal layer and the first yoke layer are formed of one and the same first magnetic metal material, and
- the second metal layer and the second yoke layer are formed of one and the same second magnetic metal material.

* * * * *